US007819747B2

(12) United States Patent
Kane et al.

(10) Patent No.: US 7,819,747 B2
(45) Date of Patent: Oct. 26, 2010

(54) METHOD AND APPARATUS FOR CONDUCTING A GAME OF CHANCE

(75) Inventors: Steven N. Kane, Brookline, MA (US); Dow Hardy, Marlborough, MA (US); Mark E. Herrmann, Wellesley, MA (US); Bijan Sabet, Sudbury, MA (US)

(73) Assignee: GameLogic Inc., Waltham, MA (US)

( * ) Notice: Subject to any disclaimer, the term of this patent is extended or adjusted under 35 U.S.C. 154(b) by 755 days.

(21) Appl. No.: 11/636,411

(22) Filed: Dec. 8, 2006

(65) Prior Publication Data

US 2007/0265068 A1 Nov. 15, 2007

Related U.S. Application Data

(63) Continuation-in-part of application No. 11/027,756, filed on Dec. 30, 2004.

(60) Provisional application No. 60/569,030, filed on May 7, 2004, provisional application No. 60/748,647, filed on Dec. 8, 2005.

(51) Int. Cl.
*G06F 17/00* (2006.01)

(52) U.S. Cl. ........................................ 463/29

(58) Field of Classification Search ............. 463/16–25, 463/29
See application file for complete search history.

(56) References Cited

U.S. PATENT DOCUMENTS

| | | | |
|---|---|---|---|
| 2,544,961 | A | 3/1951 | Kemp |
| 4,215,864 | A | 8/1980 | Nichols |
| 4,494,197 | A | 1/1985 | Troy et al. |
| 4,582,324 | A | 4/1986 | Koza et al. |
| 4,679,789 | A | 7/1987 | Okada |
| 4,689,742 | A | 8/1987 | Troy et al. |
| 4,725,079 | A | 2/1988 | Koza et al. |
| 4,764,666 | A | 8/1988 | Bergeron |
| 4,856,787 | A | 8/1989 | Itkis |
| 4,882,473 | A | 11/1989 | Bergeron et al. |
| 4,922,522 | A | 5/1990 | Scanlon |
| 5,158,293 | A | 10/1992 | Mullins |

(Continued)

FOREIGN PATENT DOCUMENTS

EP 1746550 A2 1/2007

(Continued)

OTHER PUBLICATIONS

Rules of Pai Gow Poker. Casino City. Dec. 3, 2000. Online:http://web.archive.org/web/20001203170300/http://www.casinocity.com/rule/paigow.htm.

(Continued)

*Primary Examiner*—Ronald Laneau
(74) *Attorney, Agent, or Firm*—Lando & Anastasi, LLP

(57) ABSTRACT

A system and method are provided for playing a game of chance. The game of chance may include, for example, a lottery-type game. A result of the game of chance is revealed to a player in another medium. In one example, the result is revealed during multiple game instances of one or more online games. In one example, the online game includes a dice game in which the result is revealed. In another example, the dice game is coupled with a second level game in which at least a portion of the result is revealed.

43 Claims, 8 Drawing Sheets

U.S. PATENT DOCUMENTS 5,324,035 A 6/1994 Morris et al.
5,351,970 A 10/1994 Fioretti
5,373,440 A 12/1994 Cohen
5,377,975 A 1/1995 Clapper, Jr.
5,398,932 A 3/1995 Eberhardt et al.
5,429,361 A 7/1995 Raven
5,518,253 A 5/1996 Pocock et al.
5,569,082 A 10/1996 Kaye
5,586,937 A 12/1996 Menashe
5,611,729 A 3/1997 Schumacher
5,628,684 A 5/1997 Bouedec
5,645,485 A 7/1997 Clapper, Jr.
5,653,635 A 8/1997 Breeding
5,709,603 A 1/1998 Kaye
5,722,891 A 3/1998 Inoue
5,749,784 A 5/1998 Clapper, Jr.
5,768,382 A 6/1998 Schneier et al.
5,772,511 A 6/1998 Smeltzer
5,779,549 A 7/1998 Walker et al.
5,788,573 A 8/1998 Baerlocher et al.
5,791,990 A 8/1998 Schroeder et al.
5,791,991 A 8/1998 Small
5,810,664 A 9/1998 Clapper, Jr.
5,816,918 A 10/1998 Kelly et al.
5,823,873 A 10/1998 Moody
5,823,874 A 10/1998 Adams
5,830,069 A 11/1998 Soltesz et al.
5,848,932 A 12/1998 Adams
5,860,653 A 1/1999 Jacobs
5,871,398 A 2/1999 Schneier et al.
5,882,258 A 3/1999 Kelly et al.
5,887,906 A 3/1999 Sultan
5,928,082 A 7/1999 Clapper, Jr. et al.
5,941,771 A * 8/1999 Haste, III .................... 463/17
5,944,606 A 8/1999 Gerow
5,954,582 A 9/1999 Zach et al.
5,980,385 A 11/1999 Clapper
5,996,997 A 12/1999 Kamille
6,007,426 A 12/1999 Kelly et al.
6,012,983 A 1/2000 Walker et al.
6,015,344 A 1/2000 Kelly et al.
6,024,640 A 2/2000 Walker et al.
6,028,920 A 2/2000 Carson
6,044,135 A 3/2000 Katz
6,048,269 A 4/2000 Burns et al.
6,056,289 A 5/2000 Clapper
6,059,289 A 5/2000 Vancura
6,077,163 A 6/2000 Walker et al.
6,106,393 A 8/2000 Sunaga et al.
6,113,495 A 9/2000 Walker et al.
6,146,272 A 11/2000 Walker et al.
6,152,823 A 11/2000 Lacoste et al.
6,159,097 A 12/2000 Gura
6,162,121 A 12/2000 Morro et al.
6,168,521 B1 1/2001 Luciano et al.
6,173,267 B1 1/2001 Cairns
6,179,711 B1 1/2001 Yoseloff
6,186,892 B1 2/2001 Frank et al.
6,203,011 B1 3/2001 Nulph et al.
6,203,427 B1 3/2001 Walker et al.
6,236,900 B1 5/2001 Geiger
6,241,606 B1 6/2001 Riendeau et al.
6,244,958 B1 6/2001 Acres et al.
6,251,017 B1 6/2001 Leason et al.
6,270,406 B1 8/2001 Sultan
6,273,817 B1 8/2001 Sultan
6,279,911 B1 8/2001 Cherry
6,280,325 B1 8/2001 Fisk
RE37,371 E 9/2001 Gerow
6,283,855 B1 9/2001 Bingham
6,302,793 B1 10/2001 Fertitta et al.
6,309,298 B1 10/2001 Gerow
6,311,976 B1 11/2001 Yoseloff et al.
6,312,334 B1 11/2001 Yoseloff
6,358,151 B1 3/2002 Enzminger et al.
6,364,765 B1 4/2002 Walker et al.
6,364,766 B1 4/2002 Anderson et al.
6,368,214 B1 4/2002 Luciano
6,368,218 B2 4/2002 Angell, Jr.
6,371,852 B1 4/2002 Acres
6,375,567 B1 4/2002 Acres
6,390,921 B1 5/2002 Busch et al.
6,394,902 B1 5/2002 Glavich et al.
6,402,614 B1 6/2002 Schneier et al.
6,439,995 B1 8/2002 Hughs-Baird et al.
6,471,208 B2 10/2002 Yoseloff et al.
6,488,280 B1 12/2002 Katz et al.
6,514,144 B2 2/2003 Riendeau et al.
6,523,829 B1 2/2003 Walker et al.
6,527,175 B1 3/2003 Dietz et al.
6,540,230 B1 4/2003 Walker et al.
6,543,808 B1 * 4/2003 Mitchell et al. ............... 283/49
6,565,084 B1 5/2003 Katz et al.
6,572,106 B2 6/2003 Alexoff et al.
6,572,107 B1 6/2003 Walker et al.
6,575,832 B1 6/2003 Manfredi et al.
6,582,307 B2 6/2003 Webb
6,582,310 B1 6/2003 Walker et al.
6,588,747 B1 7/2003 Seelig
6,599,187 B2 7/2003 Gerow
6,599,192 B1 7/2003 Baerlocher et al.
6,607,439 B2 8/2003 Schneier et al.
6,612,501 B1 9/2003 Woll et al.
6,612,574 B1 9/2003 Cole et al.
6,619,660 B2 9/2003 Schaefer et al.
6,620,046 B2 9/2003 Rowe
6,625,578 B2 9/2003 Spaur et al.
6,645,074 B2 11/2003 Thomas et al.
6,645,075 B1 11/2003 Gatto
6,656,042 B2 12/2003 Reiss et al.
6,663,105 B1 12/2003 Sullivan et al.
6,676,126 B1 1/2004 Walker et al.
6,679,497 B2 1/2004 Walker et al.
6,681,995 B2 1/2004 Sukeda et al.
6,682,419 B2 1/2004 Webb et al.
D486,869 S 2/2004 Webb et al.
6,685,561 B2 2/2004 Anderson et al.
6,692,353 B2 2/2004 Walker et al.
6,705,944 B2 3/2004 Luciano
6,716,103 B1 4/2004 Eck et al.
6,719,631 B1 4/2004 Tulley et al.
6,729,956 B2 5/2004 Wolf et al.
6,733,385 B1 5/2004 Enzminger et al.
6,736,324 B2 5/2004 Behm
6,749,198 B2 6/2004 Katz et al.
6,761,633 B2 7/2004 Riendeau et al.
6,786,824 B2 9/2004 Cannon
6,811,484 B2 11/2004 Katz et al.
6,824,467 B2 11/2004 Schlottmann et al.
6,843,724 B2 1/2005 Walker et al.
6,852,031 B1 2/2005 Rowe et al.
6,855,052 B2 2/2005 Weiss et al.
6,896,619 B2 5/2005 Baltz
6,899,622 B2 5/2005 Lind et al.
6,910,968 B2 6/2005 Nassef et al.
6,913,534 B2 7/2005 DeFrees-Parrott
6,918,589 B2 7/2005 Thibault
6,929,544 B2 8/2005 Osterer
6,934,846 B2 8/2005 Szrek
6,942,570 B2 9/2005 Schneier et al.
6,969,319 B2 11/2005 Rowe et al.
7,008,317 B2 3/2006 Cote et al.
7,008,318 B2 3/2006 Schneier et al.
7,024,375 B2 4/2006 Chau 7,052,394 B2 5/2006 Walker et al.
7,073,720 B2 7/2006 Behm
7,112,135 B2 9/2006 Anderson
7,118,478 B2 10/2006 Fayter et al.
7,163,459 B2 1/2007 Tanskanen et al.
7,172,506 B2 2/2007 Baerlocher et al.
7,179,168 B1 2/2007 Tulley et al.
7,186,180 B2 3/2007 Lathrop
7,213,811 B2 5/2007 Bozeman
7,275,990 B2 10/2007 Walker et al.
7,285,045 B2 10/2007 Schneier et al.
7,294,058 B1 11/2007 Slomiany et al.
7,303,468 B2 12/2007 Schneier et al.
7,303,470 B2 12/2007 George et al.
7,311,599 B2 12/2007 Knapp
7,357,393 B2 4/2008 Finocchio
7,416,484 B1 8/2008 Nelson
7,571,144 B2 * 8/2009 Beckstrom et al. .......... 705/408
2001/0046891 A1 11/2001 Acres
2001/0049305 A1 12/2001 Riendeau et al.
2002/0010015 A1 1/2002 Acres
2002/0013167 A1 1/2002 Spaur et al.
2002/0039923 A1 4/2002 Cannon et al.
2002/0042300 A2 4/2002 Acres et al.
2002/0052229 A1 5/2002 Halliburton et al.
2002/0061778 A1 5/2002 Acres
2002/0068632 A1 6/2002 Dunlap
2002/0077173 A1 6/2002 Luciano et al.
2002/0090986 A1 7/2002 Cote et al.
2002/0090987 A1 7/2002 Walker et al.
2002/0093190 A1 7/2002 Katz
2002/0098882 A1 7/2002 Lind et al.
2002/0107072 A1 8/2002 Giobbi et al.
2002/0147040 A1 10/2002 Walker et al.
2002/0152120 A1 10/2002 Howington et al.
2002/0155885 A1 10/2002 Shvili
2002/0169018 A1 11/2002 Schneier et al.
2002/0187827 A1 12/2002 Blankstein
2002/0193158 A1 12/2002 Weiss et al.
2002/0198038 A1 12/2002 Adams
2003/0013531 A1 1/2003 Rowe et al.
2003/0027628 A1 2/2003 Luciano
2003/0032473 A1 2/2003 Rowe et al.
2003/0032476 A1 2/2003 Walker et al.
2003/0045340 A1 3/2003 Roberts
2003/0047869 A1 3/2003 Walker et al.
2003/0060257 A1 3/2003 Katz et al.
2003/0060261 A1 3/2003 Katz et al.
2003/0069068 A1 4/2003 Kaminkow
2003/0080508 A1 5/2003 Thibault
2003/0102625 A1 6/2003 Katz et al.
2003/0114217 A1 6/2003 Walker et al.
2003/0119581 A1 6/2003 Cannon et al.
2003/0139214 A1 7/2003 Wolf et al.
2003/0155715 A1 8/2003 Walker et al.
2003/0157977 A1 8/2003 Thomas et al.
2003/0171986 A1 9/2003 Itkis
2003/0176210 A1 9/2003 Vancura et al.
2003/0176212 A1 9/2003 Schlottmann et al.
2003/0184012 A1 10/2003 Green
2003/0186739 A1 10/2003 Paulsen et al.
2003/0195841 A1 10/2003 Ginsberg et al.
2003/0199318 A1 10/2003 Nassef et al.
2003/0218303 A1 11/2003 Walker et al.
2003/0220138 A1 11/2003 Walker et al.
2004/0025190 A1 2/2004 McCalla et al.
2004/0036212 A1 2/2004 Walker et al.
2004/0038723 A1 2/2004 Schneier et al.
2004/0051240 A1 3/2004 Adams
2004/0053683 A1 3/2004 Hartl et al.
2004/0063484 A1 4/2004 Dreaper et al.
2004/0092307 A1 5/2004 George et al.
2004/0102238 A1 5/2004 Taylor
2004/0102239 A1 5/2004 Samila
2004/0127279 A1 7/2004 Gatto et al.
2004/0133472 A1 7/2004 Leason et al.
2004/0142741 A1 7/2004 Walker et al.
2004/0147308 A1 7/2004 Walker et al.
2004/0152504 A1 8/2004 Herrmann et al.
2004/0152510 A1 8/2004 Herrmann
2004/0180722 A1 9/2004 Giobbi et al.
2004/0185930 A1 9/2004 Thomas et al.
2004/0204222 A1 10/2004 Roberts
2004/0214628 A1 10/2004 Boyd et al.
2004/0229671 A1 11/2004 Stronach et al.
2004/0259629 A1 12/2004 Michaelson et al.
2004/0259631 A1 12/2004 Katz et al.
2005/0037841 A1 2/2005 de Waal
2005/0049042 A1 3/2005 Walker et al.
2005/0075158 A1 4/2005 Walker et al.
2005/0090314 A1 4/2005 Nassef et al.
2005/0092839 A1 5/2005 Oram
2005/0124407 A1 6/2005 Rowe et al.
2005/0164779 A1 7/2005 Okuniewicz
2005/0170881 A1 8/2005 Muskin
2005/0187005 A1 8/2005 Rose et al.
2005/0250567 A1 * 11/2005 Kane et al. .................... 463/16
2005/0258596 A1 11/2005 Such
2005/0282619 A1 12/2005 Vancura et al.
2005/0282626 A1 12/2005 Manfredi et al.
2005/0288088 A1 12/2005 Englman et al.
2006/0025219 A1 2/2006 Nassef, Jr. et al.
2006/0035696 A1 2/2006 Walker et al.
2006/0036450 A1 2/2006 Nassef, Jr. et al.
2006/0041586 A1 2/2006 Nassef et al.
2006/0068893 A1 3/2006 Jaffe et al.
2006/0073884 A1 4/2006 Walker et al.
2006/0089194 A1 4/2006 Joshi et al.
2006/0148562 A1 7/2006 Walker et al.
2006/0194631 A1 8/2006 Rowe et al.
2006/0205511 A1 9/2006 Thomas et al.
2006/0247035 A1 11/2006 Rowe et al.
2007/0054729 A1 3/2007 Hornik et al.
2007/0060261 A1 3/2007 Gomez et al.
2007/0060274 A1 3/2007 Rowe et al.
2007/0060317 A1 3/2007 Martin et al.
2007/0060329 A1 3/2007 Martin et al.
2007/0060330 A1 3/2007 Martin et al.
2007/0060331 A1 3/2007 Martin et al.
2007/0060369 A1 3/2007 Martin et al.
2007/0087834 A1 4/2007 Moser et al.
2007/0167216 A1 7/2007 Walker et al.
2007/0173322 A1 7/2007 Swamy et al.
2007/0265062 A1 11/2007 Thomas et al.
2008/0032763 A1 2/2008 Giobbi et al.
2008/0039171 A1 2/2008 Slomiany et al.
2008/0039173 A1 2/2008 Walther et al.
2008/0287176 A1 * 11/2008 Bennett, III .................. 463/17

FOREIGN PATENT DOCUMENTS

EP 1762990 A2 3/2007
EP 1833014 A1 9/2007
WO WO 91/06931 5/1991
WO WO 97/37737 10/1997
WO WO 99/10057 3/1999
WO WO 99/16519 4/1999
WO 0039761 A 7/2000
WO WO 00/43087 7/2000
WO WO 00/69535 11/2000
WO WO 01/14029 3/2001
WO WO 03/004118 1/2003
WO WO 03/061795 7/2003
WO WO 03/084625 10/2003
WO WO 03/089077 10/2003
WO WO 03/089082 10/2003

| | | |
|---|---|---|
| WO | WO 2004/013820 | 2/2004 |
| WO | WO 2004/114073 | 12/2004 |
| WO | WO 2005/029279 | 3/2005 |
| WO | WO 2005/031666 | 4/2005 |
| WO | WO 2005/079242 | 9/2005 |
| WO | WO 2006/028820 | 3/2006 |
| WO | WO 2006/052469 | 5/2006 |
| WO | WO 2007/035618 | 3/2007 |
| WO | WO 2007/040707 | 4/2007 |
| WO | WO 2007/076321 | 7/2007 |
| WO | WO 2007/145999 | 12/2007 |
| WO | WO 2008/014334 | 1/2008 |
| WO | WO 2008/022083 | 2/2008 |
| WO | WO 2008/022084 | 2/2008 |

OTHER PUBLICATIONS

H.X. Mel and Doris Baker, Cryptography Decrypted, 2001 Addison Wesly, chapters 9 to 12.

Virginia Lottery games, downloaded from www.archive.org, Apr. 29, 2007.

Pop Cap Games, Bejeweled, Feb. 3, 2005, http://web.archive.org/web/20050203202244/http://www.go2share.net/game/bejeweled/index.htm.

John Scarne, Scarne's Complete Guide to Gambling, 1961, Simon & Schuster, New York, chapter 4 on lotteries, pp. 125-126.

Wikipedia, "Wheel of Fortune (US Game Show)" Wikipedia, Nov. 13, 2007 <http://en.wikipedia.org/wiki/Wheel_of_Fortune_%28US_game_show%29>.

New Jersey, State Of, "Wheel of Fortune" New Jersey Lottery, Nov. 13, 2007 <http://www.state.nj.us/lottery/instant/ig409.htm>.

New Jersey, State Of, "Lots O' Spots Bingo" New Jersey Lottery, Dec. 6, 2007 <http://www.state.nj.us/lottery/instant/ig340.htm>.

http://www.powerball.com/powerball/pb_howtoplay.asp, accessed Sep. 14, 2008, All.

Written opinion of the international searching authority (international application No. PCT/US07/76224).

Examiner's first report on patent application No. 2003298941.

* cited by examiner

METHOD AND APPARATUS FOR CONDUCTING A GAME OF CHANCE

RELATED APPLICATIONS

This application is a continuation-in-part application of U.S. application Ser. No. 11/027,756, entitled "METHOD AND APPARATUS FOR CONDUCTING A GAME OF CHANCE," filed on Dec. 30, 2004 which claims priority under 35 U.S.C. §119(e) to U.S. Provisional Application Ser. No. 60/569,030, entitled "METHOD AND APPARATUS FOR CONDUCTING A GAME OF CHANCE," filed on May 7, 2004, and this application claims priority to U.S. Application Ser. No. 60/748,647, entitled "METHOD AND APPARATUS FOR CONDUCTING A GAME OF CHANCE," filed on Dec. 8, 2005, each of which applications are incorporated by reference in their entirety.

FIELD OF THE INVENTION

The field of the invention relates generally to lotteries and gaming, and more particularly, to systems for conducting lottery-based games or casino-based gaming.

BACKGROUND

There are many different types of games that are provided that involve the issuance of a lottery ticket to play a game of chance. Lottery tickets are sold through retailers using machines referred to as point of sale (POS) terminals. These tickets are generally printed at the POS terminal, and are usually issued for some lottery drawing to be performed at a later time. Examples of these types of lottery games of chance include traditional state lottery drawings and multi-state lottery drawings (e.g., PowerBall). Another type of lottery ticket, referred to in the art as instant lottery, includes a pre-printed scratch-type lottery ticket which includes a latex or similar coating that is scratched off by a purchaser (a player), revealing one or more game indicia and whether the player won the game or series of games as indicated on the ticket. The indication is generally "instant" in that the player knows, when they scratch off the ticket coating, whether or not they won the game.

There are many online games that can be played using a computer system coupled to a communication network (e.g., the Internet). These games may include traditional games of chance, games of skill, and casino-type games, among others.

Some systems combine lottery-type games and online games. In one such system, a lottery ticket is sold to a player, who then plays a further game using a computer system. In such a game system, the ticket sold to a player includes a code which is correlated to a game seed stored in a computer system upon which a computer game is played. The computer game determines the correlated game seed, and this game seed is mapped to a series of predetermined game states that lead to a predetermined outcome. That is, the code stored on the ticket includes the outcome. In another type of system, the code stored on the ticket is an encoded form of the lottery result, which is then revealed to the player at the end of play of an online game.

SUMMARY

New and more interesting game formats are needed for lottery and casino type games that keep players' interest and therefore result in continued and/or return players. According to one embodiment of the present invention, it is appreciated there is a great deal of effort and expense to introduce additional games, especially in the casino area. In particular, as each game is introduced, its features are scrutinized by regulators prior to introduction. It therefore would be beneficial to be able to reduce the regulatory effort in introducing new games that are exciting to players to play. To this end, according to one aspect of the present invention, a system is provided having two games, one of which is already approved by regulators whose outcomes are used to drive outcomes of another game. Because the outcome determination and odds of winning the other game are driven by a previously-approved game, the regulatory hurdles associated with releasing the other game are reduced.

In one aspect of the present invention, the player is permitted to play a computer-based game (referred to hereinafter as a "primary" game) during which the game playing system reveals results of another game (referred to hereinafter as a "secondary" game). This secondary game may be a casino or lottery-based game and, according to one embodiment, this secondary game is already approved by regulators. One such game is the well-known game of Keno. However, it should be appreciated that the secondary game may be any other type of game (e.g., a lottery game). The primary game may be any type of computer-based game, including games of skill and/or chance, such as card games, casino games, video games or any other type of game through which a result from another game may be revealed. In one aspect of the present invention, the play of the primary game that the player plays does not affect the outcome of the secondary game. In another aspect of the present invention, the secondary game result does not affect the outcome of the primary game played by the player.

In one example, the primary game involves some level of influence by the player on the outcome of the primary game. For instance, the primary game may be a game of skill. However, it should be appreciated that the primary game be a game based on chance, or combination of skill and chance. In one example, the primary game may be a dice-based game. As can be appreciated with the well-known dice game of craps, dice games are complex games of chance having complex rules and odds. Because of this, most players are not drawn to such types of games, and the popularity of such games is restricted to certain types of players. What is needed, therefore, are game formats that are less intimidating for players to play and that attract many different types of players. Further, such games may include a dice-based game that is adaptable to reveal a result of a secondary game as discussed above.

As is known, dice games usually involve one or more die elements that include indicia on a plurality of sides of the die. When the player "rolls" one or more dice, the die indicia (or combination thereof) determines whether the player wins, loses, or otherwise advances in the game. Dice games may involve one or more rolls of the dice, may involve one or more players and/or turns of the dice roll.

According to one embodiment, a dice game is provided that has simple rules to attract more and varied players to play the game. In one example game form, the game may involve a single player that rolls one or more dice to obtain an outcome predicted by the player. For instance, the player may predict an outcome of a roll of three dice, the player may roll the dice, and if one or more of the predicted dice outcomes matches the rolled dice outcomes, the player may win a prize. According to one aspect of the present invention, the result of the dice roll is adjusted to reflect a win/loss outcome in a secondary game (e.g., a Keno draw, bingo draw, etc.). However, the dice roll appears to the player to be randomly determined, and therefore, it appears to the player that his/her choice regarding the predicted dice outcomes has an impact in the overall outcome of the game.

According to one embodiment, the dice game may involve one or more rolls of the dice by a player. At each roll, the player may be required to predict an outcome of one or more of the dice. At each roll, the player may be presented an outcome that is associated with a predetermined outcome of a secondary game. In one example game format, outcomes associated with a number of rolls of the dice are correlated to an overall outcome, which may correlate to an outcome of a secondary game. In one example game format involving a dice game, the player may be allocated 10 rolls of three dice, and may be permitted to predict the outcomes of each of the 10 rolls. Collectively, the outcomes of the rolls may reveal a prize associated with a secondary game. This prize may be predetermined prior to the player rolling the dice.

According to another aspect of the present invention, the dice game may be combined with a second level game. Play of the second level game may proceed after some achievement level in the dice game. For instance, the player may play the dice game as discussed above, and in one embodiment, the second level may proceed after the player successfully plays a series of instances of the dice game. Alternatively, the player may play the dice game until completion, and at an ending of the dice game (e.g., the player quits, uses a control to automatically play the dice game, etc.), the player begins playing the second level game.

According to one aspect of the present invention, the result of the primary game is stored on a server coupled to a computer system upon which the game is played. In one example, the result is downloaded to the computer system prior to game play. The result may be in the form of intermediate results of each game instance that are displayed to the player at various points during game play. For instance, intermediate results may be displayed to a user during an instance of a dice game. For example, intermediate results may be shown to a player when a particular die result is revealed, a particular outcome is achieved (e.g., the player obtains a particular dice combination) or other achievement during the play of a dice game.

In one embodiment of the present invention, the dice or similar game is coupled with a second level game. Further, during the play of the dice game, one or more items are awarded to the player for use in the second level game. For instance, items are awarded when the dice game is played. In the example of the dice game, there may be an indication in a pay table that one or more card combinations provide the player with one or more items (e.g., item(s) that may be used with a second level game). For instance, the second level game may be a slot machine-type game, and one or more spins may be awarded to the player during play of the first level game. In one embodiment, a pay table is provided that correlates dice combinations with a number of spins awarded to the player. In another example, a pay table is provided that correlates dice combinations with a number of points awarded to the player. If the player achieves a particular point total, that player may receive an item for use in the second level game.

The player may, in the first level game, accrue more than one item. In yet another example, if the player achieves a particular point value, the second level game may be initiated. In any of the examples, the player may or may not achieve the second level game. Of course, if the player is determined prior to play as receiving a prize, results received in the first level game may be adjusted so that the player proceeds to the second level game independent of the skill (or lack thereof) in playing the first level game. In one example, the player may begin game play of the first level with one item awarded to ensure that the player proceeds to the second level game.

In one embodiment of the present invention, a dice game played in a first level game is combined with a slot machine game played in a second level game. The player, in one example, collects one or more spins to be used in the slot machine game. As discussed, the player may be awarded one or more spins based on his/her play of the dice game. The game program may adjust the results in the second level game according to the number of spins earned in the first level game. According to one aspect of the invention, the number of spins awarded to the player may be "fixed", and therefore, the results of the dice game may be adjusted to yield particular outcomes. These outcomes may be adjusted depending on the game play by the player. In another example, the player may begin play in the first level game with one spin awarded to ensure that the player proceeds to the slot machine or other second level game.

Alternatively, items may be awarded with corresponding elements (e.g., a die result associated with the first level game). This indication may be, for example, a graphical, textual, or other symbolic indication that the element contains an item. In one example, this indication may be the same or similar element used to indicate that there is a hidden item associated with the element. The type of hidden item may not, according to one embodiment, be known by the user until the hidden item is revealed during game play. In one example, when a die is rolled having the hidden item, the game program displays the hidden item to the player. The hidden item may be, for example, an item that is used to reveal prizes in a second-level game (e.g., a spin). Alternatively, the player may be awarded a prize (or not) with the revealing of each hidden item.

In another example, the first level game may contain more than one hidden item, and these items may be collected by the player as hidden items are revealed. When the game has ended, the player may use the one or more collected items in the second level game. In one example game, the items revealed during the dice game are used to open hidden items in a second level game. For instance, the second level game includes a series of boxes (or other element type) which are opened (and their hidden items revealed) with items collected during the play of the dice game. However, it should be appreciated that the items may be any type of item that can be used in a second level game. In another example, the player may be presented a finite number of chances to open prize boxes that may reveal one or more prizes.

Prizes awarded during the second level of play may be, for example, a cash prize awarded for a particular game. It should be appreciated, however, that other prizes may be awarded (e.g., merchandise, credit, free play, etc.) and that the invention is not limited to any particular prize type.

According to one aspect of the present invention, prizes revealed during the second level game may be stored in a database of the server and downloaded to the client prior to play. In this example, the player may be allowed, when a ticket is purchased at a POS, the ability to play a number of instances of the game. Prizes may be awarded, for example, at each instance of the second level of the online game. To this end, the result of each prize may be stored in the database of the server, and may be indexed by an identifier of the ticket. For example, the identifier may be a serial number or other ticket-identifying information.

According to one aspect of the present invention, prizes are only awarded in the second level game. In another example, after a prize is revealed (or not) in the second level game, the player is permitted to play any remaining instances of the primary game (e.g., a slot-machine type game or dice game). According to another embodiment, the player may not be permitted to replay game instances after they have been played. To this end, a game-playing system may maintain a status of the game instances played by the player. The game-playing system may maintain other information, such as game play information, how prizes are revealed to the player, and other information that may be useful for assessing or auditing game play and playing experiences of the player.

Each instance of the game may include an associated prize (or not), and these prizes may be combined for an overall prize associated with the ticket. In one example, the prize associated with the first instance of the dice game and its second level is $10.

Each instance of the game may include an associated prize (or not), and these prizes may be combined for an overall prize associated with the ticket. In one example, the prize associated with the first instance of the dice game and its second level is $10. A prize associated with a second instance of the dice game and its second level is $15. The prizes associated with each instance of the dice game and its second level may be stored as an entry in the database of the server.

In an alternative embodiment, there is one instance of the dice game, wherein there are multiple win opportunities within the single instance. For example, in a single game, there may be win opportunities associated with certain letter spins of the slot machine game. When a spin associated with one of the win opportunities is performed, a prize may be (or not) revealed to the player. A combination of these revealed prizes may total to a total prize associated with a particular ticket. The result of each spin may be predetermined as discussed above to provide the overall prize.

As an alternative to each result of each game instance being predetermined, the result of each prize for each instance of the game may be determined dynamically by the client computer. For example, if the overall prize (e.g., $25) for the ticket is known, the client can determine (e.g., randomly) a distribution of winnings of the overall prize among game instances. In the example above, a play of the ticket on one computer could award a $25 prize among two game instances as follows: $5 prize for the first game instance and $20 for the second game instance. Another play of the ticket on the same or different computer may award a $25 prize differently among the two game instances (e.g., $10 for the first game instance, $15 for the second game instance, etc.). It should be appreciated, however, that the game may include any number of game instances, and the prize associated with each game instance may be stored in any storage location (e.g., at the client computer, at the server, etc.).

In another example system, prizes may be awarded in association with each item collected in the game (e.g., a collected item in a dice game). Therefore, prizes may be distributed among hidden items in the game grid as well as being distributed among game instances. As discussed, prize distribution may be stored in a database of the server, may be determined by the client (e.g., randomly), or may be stored at any location or be determined by any manner by the client.

According to another aspect of the present invention, an improved game experience is provided for revealing the result of an online game. As discussed above, a player purchases a ticket or other game piece at a POS or other location. On the ticket, multiple plays of an associated online game are provided with each ticket or other game piece. The player can play those multiple plays across a set of games. For instance, the set of games may include, for example, games of skill and/or chance as discussed above. Certain games may include one or more attempts (or opportunities) for winning prizes. These opportunities for winning may be associated with one or more prizes. For example, a player playing a slot machine may be awarded a certain number of opportunities to play a game (e.g., a game instance (or game play) or other opportunity to win a prize when playing a particular game instance). In the case of a slot machine game, the player may be given a particular number of spins of the slot machine game, and, as a result of each spin, the player may be awarded (or not) a prize. In one embodiment, the result of the overall game is predetermined, and a game experience is determined for each opportunity (e.g., spin) that results in a contribution to the result of the overall game.

According to one embodiment of the present invention, the type of game that is played is immaterial to the outcome revealed to the player. More particularly, the same outcomes associated with a particular ticket may be used to drive multiple types of games. This allows, for example, the gaming operator to offer multiple types of games with a single ticket, and allows the player to select which game(s) to play to reveal the outcomes associated with the particular ticket. For instance, the player may elect to play a slot machine game or other type of game for a first game instance of a ticket, and for a second instance, play a dice game. Of course, it should be appreciated that any type of game and other combinations of games are possible. In this manner, the player may be provided the flexibility to play particular games in which the player is interested, thereby increasing his/her interest and participation in the game. Further, the game operator is provided additional flexibility as new games may be introduced/substituted that are associated with the same ticket or other game piece.

According to one embodiment of the present invention, the outcome of the game is predetermined at the time of ticket printing, issuance, or purchase or shortly thereafter. That is, the game outcome associated with a particular ticket is available prior to, at the same time, or shortly thereafter the ticket is provided to the player, after which time the player is permitted to play any games to reveal the predetermined outcome. In another embodiment, outcomes associated with tickets issued to the player are determined some time after the ticket issuance (i.e., outcomes are "post-determined"). Such is the case with Keno or other drawing-based games wherein game outcomes are determined after ticket issuance. In such a game, players are permitted to obtain the outcome at a predetermined time, usually after the player has purchased the ticket. In one aspect of the invention, it may be beneficial to have a later activation of tickets, especially in the case of a ticket-based game where tickets are issued in some other gaming environment (e.g., a casino). It may be desirable to only permit the player to play such a game outside the gaming environment so as not to compete with other games. Additionally, it may be desirable to require the player to revisit the gaming environment to redeem the ticket and increase the chances that the player will purchase additional tickets or play other types of games offered in the gaming environment.

Also, according to another aspect of the present invention, a first game may be used to reveal the result of a second game. As discussed above, this second game may be one which is already approved by regulators. Such a system may be, for example, a game whose results are driven by a random number generator (or RNG as referred to in the art). One such game is the well-known game of Keno. Another game that may be used is the well-known game of bingo. Other games may be used to drive the result of an online game.

In one example, a Keno game and its associated system are used to generate reveal results which are revealed to a player during play of an online game. To this end, a Keno-based system may be used in conjunction with an online gaming system to present new and interesting online games whose outcomes are driven by results provided by the Keno system. In one particular example, a Keno system provides a correlation of a ticket identifier to a Keno game which is held at some predetermined time. As the Keno numbers are drawn, an outcome is produced associated with the particular ticket identifier and provided to an online gaming system. The online gaming system uses the produced outcome to render a new and interesting gaming experience within an online gaming environment. As discussed, such an environment may include online play of one or more online games of skill, chance, or combination thereof.

According to one embodiment of the present invention, wins are optimized across game instances associated with a ticket. For instance, a ticket may have a predetermined outcome (for example, awarding a prize of $50), that may be allocated across the game instances associated with that ticket. For example, in the case of winning $50 on a 5-play (5 game instances) ticket, it may be desired to allocate the wins across game instances to provide a particular game experience. For instance, the game experience of winning $50 may be distributed across five game instances (e.g., five separate games, respectively winning $5, $0, $0, $5, $40) to provide the player an early indication of winning. Also, the remaining game play of the game instances may be scripted to build the drama of the game experience while still retaining player interest. Such a scripted outcome is more interesting, according to one embodiment, as the player is presented an outcome in a way such that retains interest in the game. This is beneficial, as an overall result includes extending scratch-type games or other type of game experience beyond the point of sale, and beyond the instant (but fleeting) gratification associated with scratch-type or other instant ticket game experiences.

According to one embodiment, a player is permitted to wager and redeem bets at authorized locations (e.g., legal jurisdictions such as lottery retail establishments, casinos, and the like) while the online portion of the game may be played in any locale or jurisdiction. In such a case, the casino or lottery experience is extended to locations where otherwise lottery and/or casino games are not available. Thereafter, players return to the lottery or casino establishment to redeem their tickets thereby providing yet another opportunity to entertain the player.

According to yet another aspect of the present invention, winning results may be split across opportunities to win. One embodiment of the present invention relates generally to how wins are shown to the player across win opportunities. In one specific example, one embodiment relates to a method for revealing wins to a player across a play of multiple game instances that build excitement for the player and which holds the interest of the player in continuing to play the game. It is appreciated that the game experience may be made more compelling if wins are distributed among win opportunities in an interesting way.

Another method for maintaining the interest of players includes awarding additional opportunities to win with each ticket. For instance, one of the prizes awarded with a particular opportunity to win (e.g., during the play of the game instance) may be one or more additional opportunities to win. For instance, in a slot machine game, an issued ticket may be associated with five (5) spins. One of the prizes awarded with the ticket may include additional spins. At the time of initial ticket activation, it may be predetermined that the ticket is associated with these additional opportunities to win, and these additional opportunities may be associated with the issued ticket. The player, when playing the game, will obtain additional satisfaction in playing because the number of game instances to be played by the player are increased, and therefore, their opportunity to win is also increased. This may be beneficial to create a more realistic gaming experience (such as in casino slots) where additional spins may be awarded during casino play. However, unlike casino play wherein slot play can be continued from an online account or by placing additional bets to create a more continuous game experience, the additional spins are awarded to a single ticket.

In the case where an online game system is a Keno-based or other drawing-based systems wherein results are not predetermined, additional opportunities to win may be associated with the ticket in the form of additional numbers selected by a computer system and associated with the ticket at the time of a drawing. This may be performed, for example, by assigning one or more additional drawing entries as a prize itself in the pay table associated with the Keno or other drawing-based game. More particularly, the drawing entries may be awarded as prizes, which themselves are indexes into other entries in the same pay table. Such additional entries may correspond to one or more prizes. For example, when the drawing occurs, the additional plays are awarded to the drawing numbers associated with the ticket. These drawing numbers may be associated with a particular game instance, of which there may be many associated with one ticket. At the point when the ticket is activated by the result of the drawing and play of the online game is permitted, the player, upon the beginning of play of the ticket or a particular game instance, the player is awarded the additional plays (and therefore, any prizes) associated with these additional plays. The additional plays may be played as additional game instances, which themselves have additional reveal opportunities. Alternatively, additional reveal opportunities may be added to one or more other game instances to make game play more exciting.

In another example, additional opportunities to win are awarded to a ticket, but these additional opportunities are awarded for a future game instance. In one example, the game reveals, during a win opportunity (e.g., a spin, a reveal, etc.) in a first game instance, one or more win opportunities within a second game instance. These win opportunities may be redeemed and "added on" to the second game instance, or the win opportunities may be provided as part of a "free play" of an additional game instance. In the case of a game driven by a drawing-based system (e.g., Keno, bingo, etc.), additional win opportunities may be provided for game instances conducted at a later time. For example, in a first game, a player may be provided a "free play" of a game instance to be conducted (or available to be played) at a particular start time. To this end, the player may be provided an additional code that allows the player to play the game at the later time. In the case of a subscription-based system where a player subscribes to play more than one game, the player may have additional plays added to his/her existing subscription.

In another aspect of the present invention, winnings by a player may be redeemed online to allow the player to play further instances of the online game. For instance, the player, after receiving a prize when playing a particular game instance, is permitted to redeem the prize online. In one type of online redemption, the player is provided one or more additional game instances to be played. To this end, the player may be provided one or more access codes allowing the player to play the additional game instance(s). These additional access codes may be provided to the player in an interface of the game, by e-mail, or other method.

According to another aspect of the present invention, a method is presented for providing players an enhanced gaming experience. According to one embodiment, it is appreciated that it is beneficial to enhance players' interest in playing games, particularly losing ones. In one embodiment, an illusion is presented to players to provide the illusion of being very close to winning a particular game. For instance, in the case of a slot machine, the slot machine result may indicate, in a three-wheel slot machine, that the player received a winning combination of two of the first wheels, and only with the revealing of the last wheel does the player realize that he/she has lost the game. According to one aspect, it is realized that the losing game experience should compel the player to continue playing the game.

In another example system, prizes may be awarded in association with each item collected in the game (e.g., number of points in a slot machine type game). Therefore, prizes may be distributed among elements or levels during play as well as being distributed among game instances. As discussed, prize distribution may be stored in a database of the server, may be determined by the client (e.g., randomly), or may be stored at any location or be determined by any manner by the client.

According to another aspect of the invention, it is appreciated that conventional methods for playing online games of chance are not secure. In particular, because the result or outcome of the game or predetermined sequence of game states may be encoded on a ticket, the lottery game may be compromised if the winning codes are deciphered. Such a deciphering could occur, for example, by hacking a computer system associated with the online lottery and obtaining a list of winning tickets, or reverse engineering software (e.g., on a PC) where the winning codes or sequence of game states may be stored. Further, it is realized that in such conventional systems, the lottery ticket or the online game software and its data are single points of security failures in the system.

One aspect of the present invention relates to a method for conducting a game of chance. According to one embodiment, a more secure method is provided by which an online game may be played. Instead of placing a game seed that determines a sequence of game states on a ticket (e.g., an instant scratch or lottery ticket), the game states or outcomes may not be placed on the ticket. Rather, the outcomes may be stored in an online database. To this end, a code may be stored on the ticket, the code being used as a decryption key used to find the outcome stored in the database. In particular, there may be a mapping between an outcome code and a corresponding decryption key that is printed on the ticket.

Because the decryption key is placed on the ticket, unauthorized access to the online game is not permitted without the physical ticket. In another embodiment, a portion of the decryption key is placed on the ticket, and another portion is stored in a database associated with the online game. In this manner, security cannot be breached without having both portions of the key (either having the issued ticket portion or the online portion). Thus, a hacker may not compromise a lottery ticket database without the ticket, and, by virtue of having a winning ticket, other winning ticket numbers may not be determined. Access to the online portion of the key may be obtained, for example, by providing some other information (e.g., a serial number printed on the ticket). However, it should be appreciated that the information used to gain access to the online portion of the key need not be printed on the ticket—the information may be provided on some other medium or by another method. The ticket may be, for example, a scratch-type lottery or "instant" ticket, pull-tab, or type of pre-printed ticket type. Alternatively, the ticket may be a printed lottery ticket as is known in the art, which is a ticket printed at a Point of Sale (POS), usually in the form of a lottery drawing ticket (e.g., PowerBall or other type lottery drawing game). Also, the ticket may be an electronic ticket issued by a computer system. It should be appreciated that the ticket may be any type of ticket issued in any form, and the invention is not limited to any particular ticket type method of issuing a ticket.

According to one aspect of the present invention, a method for playing a game of chance is provided. The method comprises acts of issuing a ticket to a player, the ticket including a code printed on a surface of the ticket, and providing for the player to play a dice game on different medium than the issued ticket, wherein the code is used to gain security access to obtain results of the game of chance. According to one embodiment of the invention, the act of issuing a ticket includes issuing at least one of a lottery ticket, a scratch ticket, and a pull-tab ticket. According to another embodiment, the act of providing further comprises an act of providing a computer-based game which the player plays to reveal the results of the game of chance. According to another embodiment, the act of providing a computer-based game further comprises an act of permitting access to the results of the game of chance by using the code as a decryption key to obtain the results. According to another embodiment, the method further comprises an act of storing, on a server, the results of the game of chance.

According to one embodiment of the invention, the method further comprises storing, in a database of a computer system, a portion of a decryption key, the portion being used along with the code by the computer system to obtain the results. According to another embodiment, the act of providing includes an act of permitting access to a website to play the dice game. According to another embodiment, the method further comprises an act of obtaining, from the database of the computer system, the portion of the decryption key based on an identifier printed on the ticket. According to another embodiment, the identifier is a serial number associated with the ticket. According to another embodiment, the method further comprises an act of presenting, to the player, an interface in which the player is permitted to enter the code to obtain security access to the results. According to another embodiment, the dice game includes an act of predicting by the player of one or more die outcomes. According to another embodiment, the dice game includes an associated second level game.

According to one embodiment of the invention, the dice game is a computer-based game involving a plurality of rolls of one or more dice, and wherein the player plays the plurality of rolls of one or more dice within an interface of the computer-based game. According to another embodiment, the ticket discloses the number of game instances of the dice game awarded to the player. According to another embodiment, the prize total for the ticket is predetermined. According to another embodiment, the sequence of reveals is predetermined. According to another embodiment, the reveals are randomly determined by the client. According to another embodiment, the sequence of reveals is stored in a database of a server. According to another embodiment, the method further comprises an act of revealing, to the player, an item associated with a second level game. According to another embodiment, the item is used to play a second level game. According to another embodiment, the item is used by the player to reveal a prize won by the player during play of the second level game. According to another embodiment, an act of playing the dice game reveals an outcome.

According to one embodiment of the invention, the method further comprises acts of determining whether the results of the game of chance includes a winning outcome, and if so, presenting to the player one or more of the predicted die outcomes as a winning outcome. According to another embodiment, the method further comprises an act of displaying, if the results of the game of chance includes a winning outcome, a prize awarded to the player. According to another embodiment, the results of the game of chance are determined prior to play of the dice game. According to another embodiment, the outcome is independent of play of the dice game. According to another embodiment, the prize won by the player is at least one of cash, merchandise, and credit. According to another embodiment, an indication of the prize won by the player is stored in a database of a server, and is downloaded to a computer presenting the computer-based game to the player. According to another embodiment, the method further comprises an act of associating, with the ticket, additional opportunities to win.

According to one embodiment of the invention, the additional opportunities to win include one or more additional reveals of results associated with the game of chance. According to another embodiment, the one or more additional reveals of results are presented during play of an online game. According to another embodiment, the method further comprises an act of providing, by a first server associated with a first game, a result associated with the game of chance. According to another embodiment, the method further comprises an act of storing, in a memory of a computer system, the result associated with the game of chance. According to another embodiment, the method further comprises an act of associating the result with an indication of the ticket. According to another embodiment, the indication of the ticket is unique among indicators of a plurality of tickets. According to another embodiment, the first server further comprises a random number generator, and the random number generator performs an act of determining a set numbers associated with the issued ticket.

According to one embodiment of the invention, the method further comprises an act of determining a set of winning numbers associated with the game of chance. According to another embodiment, the method further comprises an act of determining the result of the game of chance based on a comparison of the set of numbers associated with the issued ticket and the set of winning numbers. According to another embodiment, the game of chance includes at least one of a Keno game and a bingo game, and the act of determining a set of numbers associated with the issued ticket comprises an act of selecting a predetermined number of numbers from a predetermined set of numbers. According to another embodiment, the player must wait until a specific event has been completed before gaining access to obtain results associated with the ticket. According to another embodiment, the issued ticket discloses a number of game instances awarded to the player. According to another embodiment, the prize total for the ticket is determined after the ticket is issued to the player. According to another embodiment, the method further comprises an act of determining an outcome associated with the ticket based on a drawing.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 2:
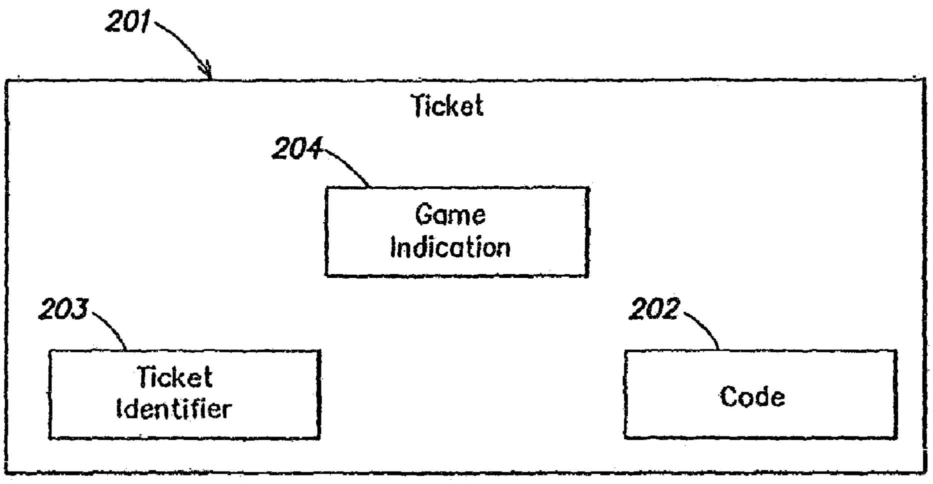
FIG. 2 is an example ticket that may be issued in association with a game according to one embodiment of the present invention.

FIG. 2 shows an example ticket 201 that may be issued to a player. The player may scratch a surface of the ticket (in the case of a scratch ticket) to reveal one or more indications. These indications may include, for example, a serial number of the ticket, an access code, or other indication (or combination thereof that may be used to access the online game. Alternatively, the ticket may be a pull-tab ticket, printed ticket (e.g., printed on thermal paper or by other methods) or other ticket type suitable for presenting indications to a player.

The ticket may include other indications (e.g., a decryption key or portion thereof as described above that may be used to decrypt game results). Also, the ticket may indicate to a player the number of plays of a second game (e.g., as played by the player on a computer system). For instance, in the case of a slot machine game, the ticket may indicate the number of spins that a player may be awarded by the ticket. In the case of a dice game, the ticket may indicate the number of game instances (or plays) of the dice game that can be played by the player. Further, as discussed above, the player may be permitted to play any one of a number of offered games, and the player may select different games to play to reveal results associated with game instances. The ticket may be associated with one or more games, and there may be indications on each ticket that show which games (e.g., a dice game) to which the ticket provides access. The ticket may be associated only with a single game (e.g., a single-branded game) or may be indicative of multiple games that can be played.

In one embodiment, ticket 201 includes a code 202 printed on a surface of the ticket that provides access to outcomes (e.g., prizes) stored on the server. As discussed, code 202 may also include, as an optional feature to increase security, a key that may be used to decrypt the outcome. This outcome may be stored in a database stored on a server system. Ticket 201 may also include a ticket identifier 203 used to identify the ticket, and which may be used to identify the outcome associated with the ticket. Further, ticket 201 may include a game indication 204 that relates information relevant to a game played on a computer system. For example, there may also be stored, on the ticket, an identifier that indicates, to the player, the number of plays associated with an online game. In one example, a player purchases a ticket at a retailer or other POS location.

Figure 1:
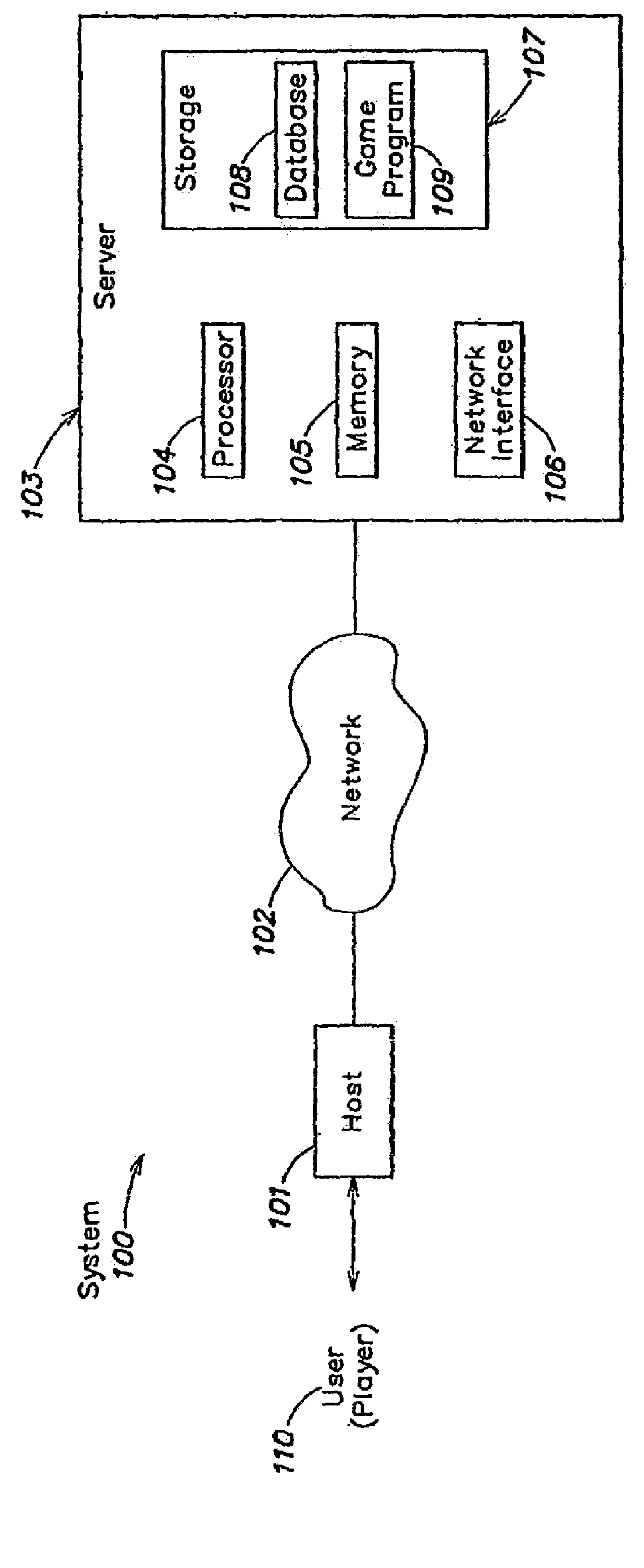
FIG. 1 is block diagram of a system for conducting a game according to one embodiment of the present invention.

The player then proceeds to play a game on a computer system. FIG. 1 shows an example system 100 according to one embodiment of the invention upon which a game may be played. The user (a player) 110 plays a game through an interface of a host computer system (e.g. host 101). Host 101 may be any type of computer system that is capable of playing a game. The host may be, for example, a general-purpose computer system (e.g., a personal computer (PC)) that connects to a network (e.g., the Internet). Other general purpose computer system types (e.g., a PDA, a cell phone, set-top box, or other system type) may be used to play the game.

The computer system may be coupled to a server system 103 through one or more communication networks 102. The server may provide a game program 109 that is executed by host 101 for playing the game. More particularly, game program 109, when executed, may provide an online game that can be played by a user through an interface associated with host 101. This online game may be, for example, a video slot machine, blackjack, or other online or casino-type game.

The game program may be stored, for example, in a computer-readable medium (e.g., a memory, storage, or other media) associated with server 103 that provides game programs. For instance, the game program may be stored on a web server and downloaded to a client computer over the Internet. Game program 109 may be one of a number of game programs associated with an online game experience. Different game programs may be selectively downloaded to the client, based on the type of game ticket issued, the game selected for play by the user, the type of client used, or other criteria.

Server 103 may also be a general-purpose computer system, or any other type of computer system capable of authenticating tickets, providing game programs, and performing other game-related functions. Further, it should be appreciated that various game functions may be performed by one or more server systems. Server 103 generally includes a processor 104 for executing server-based game functions. Server 103 may also include a memory 105 for storing data associated with game programs. Server 103 may also include one or more network interfaces 106 that couple server 103 to network 102, which permit server 103 to communicate with one or more hosts. Further, server 103 may include one or more storage entities 107, including disks or other media for storing data. In one embodiment, storage 107 is adapted to store one or more game programs 109 as discussed above. Server 103 may have any number or type of processor that executes an operating system and one or more application programs. In one embodiment, server 103 provides web server content to one or more clients for the purpose of accessing and playing the game.

Server 103 may also include a database 108 that is adapted to store one or more outcomes associated with a ticket or other gaming piece. As discussed, the outcome may be indexed using an identifier of the ticket.

Figure 3:
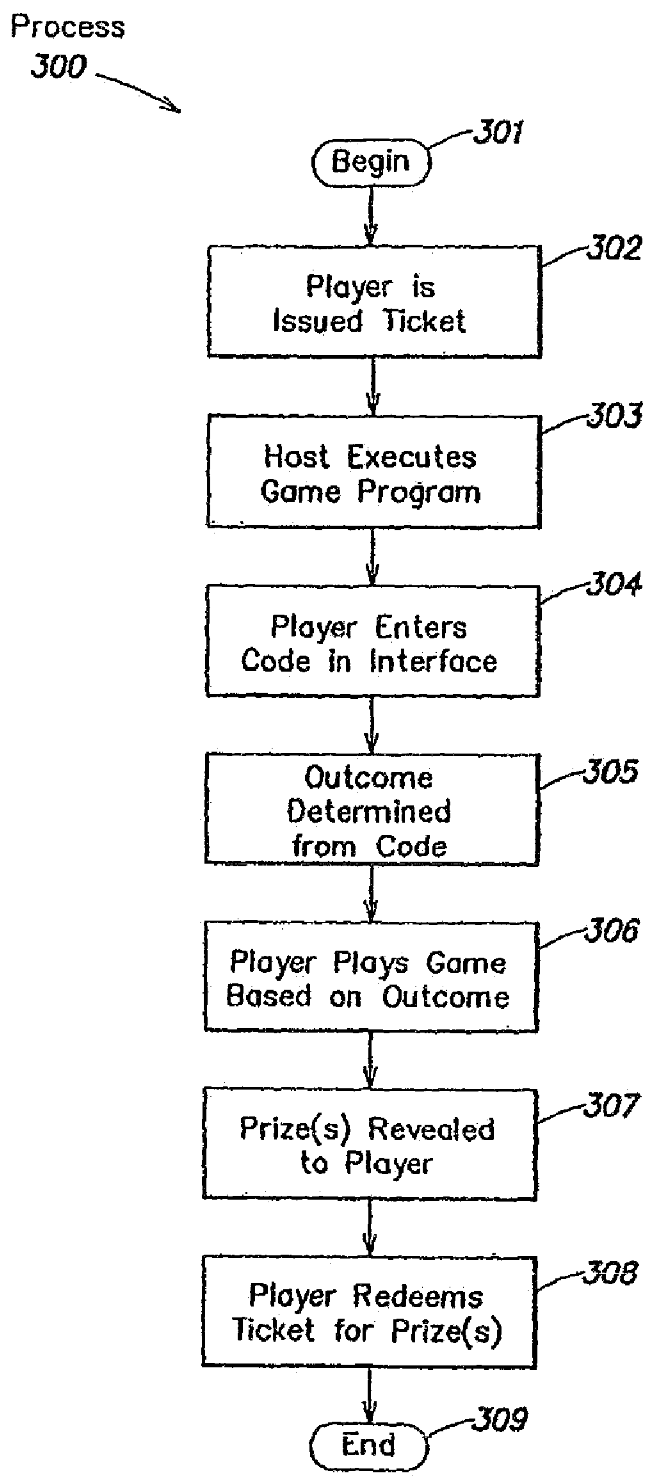
FIG. 3 is a flow chart of a process for conducting a game according to one embodiment of the present invention.

FIG. 3 shows one example process for conducting a game according to one embodiment of the present invention. At block 301, process 300 begins. At block 302, a player is issued a ticket. As discussed, a player may purchase a ticket at a retailer or other POS location. At some later time and/or location, the player may play an online game on one or more computer systems (e.g., a PC or other computer system capable of playing games). For instance, at block 303, a host computer system (e.g., host 101) executes a game program. The game program may be, for example, an online game that includes one or more components downloaded over a communication network (e.g., the Internet).

As discussed, the ticket may include a code which is used to access the outcome of a game. This code may be printed on a face of the ticket as discussed above with reference to FIG. 2. In one example system, the player accesses a website that includes an interface in which the player may enter the code at block 304.

This interface may be, for example, used to access the game, or may be any other interface (e.g., an interface used to access a download website used for downloading game software (e.g., game program 109)). The interface may be programmed in one or more computer languages (e.g., an HTML, Java, Macromedia Flash, or other type interface) and may include a text entry box in which the player can input the code. The interface may include other ways of entering a code or other parameter (e.g., a glyph printed on a ticket) that allows the user to gain access to the game. It should be appreciated that the invention is not limited to any particular method for entering the code, or any format of the code, and that any type of code or method of entry may be used.

The player enters the code, and an outcome is determined at block 305 based on the code. More particularly, there may be a mapping between the code printed on the ticket and an outcome stored on the server. This code may be stored, for example, in a database structure stored in database 108 of the server. Database 108 may be, for example, a relational database, object database, flat file database, or other organizational entities used to store and maintain data. Further a listing of winning codes may be furnished to an organization that provides the game (such as, for example, a state-run lottery commission). The code may, as discussed above, include an optional decryption key that decrypts an entry stored on the server. This entry may indicate one or more outcomes of game instances.

The outcome of the game is then used by the online game to determine play of the game by the player at block 306. For instance, if the stored outcome is "Win $50," the online game may present an outcome to the player that indicates that the player won a $50 prize. This presentation may be in the form of one or more reveals presented to the player while playing the online game at block 307. The presentation may be progressive, in that the ultimate outcome (e.g., "Win $50") is achieved through a set of reveals or progressions through the online game. For example, in the case where a dice game is played wherein items (e.g., spins) are collected for playing in a second level game, such reveal outcomes of each instance of the dice game may be stored on the server.

As discussed, prizes may be distributed over game instances and/or items (or more generally, win opportunities) to maximize game interest and to entice the player to play each game instance associated with a particular ticket. For example, one approach may include providing to the player an early (relative in the series of game instances) indication of winning to keep the player interested. As the player plays more game instances, the magnitude of the prizes may be adjusted such that a level of game "drama" is increased. That is, prize values are adjusted among later game instances to provide relatively higher prize values in later games. Other approaches/distributions may be provided for increasing or maintaining game interest.

Once played, the player may redeem the ticket at the point of sale or other redemption location at block 308. Alternatively, the player may be permitted to redeem the ticket without playing the game. Redemption may be permitted, for example, after a predetermined time. For instance, the player may be permitted to redeem a ticket after a set time (e.g., 10 PM), a particular time period after ticket purchase (e.g., 24 hours) or other absolute or relative time. This may be the case for a Keno or lottery-based system, where a Keno or lottery result is made available at a set time after ticket purchase. Alternatively, tickets may be redeemed immediately after purchase. At block 309, process 300 ends.

Payouts may be determined by a pay table associated with the game. The number of tickets may be determined a priori, and a pay table that determines payouts may be allocated to the tickets. This allocation may be determined, for example, by shuffling the pay table and allocating results to tickets. The following is an example of a pay table that may be used with a game according to one embodiment of the invention:

Number of Tickets Issued: 2000

Ticket Price: $5

TABLE I

Example Payout Table

| Number of Tickets | Payout |
|---|---|
| 1 | $100 |
| 700 | $10 |
| 500 | $5 |
| 100 | $1 |
| 600 | $0 |

Game Operator Return: $300 (3%)—Expenses

As shown in the example above, a certain number of tickets may be allocated as winning tickets having a particular payout (e.g., an outcome). Some tickets may have no payout associated with them, and some may only have a nominal payout (e.g., a small award amount, free ticket, etc.). A small number of tickets may include a large payout as compared to the magnitude of other payouts. It should be appreciated, however, that payouts are not limited to money, but other types of prizes may be awarded including merchandise, credit, loyalty points or any other representation of value.

The odds of winning may be the type of odds experienced in actual (rather than computer-based) games. Alternatively, the odds of winning may not necessarily be "natural" odds of winning any particular type of game, but rather, the odds may be adjusted to obtain the outcome desired (e.g., by the gaming operator). The odds of winning, number of winning tickets, amount of payout per ticket, or other payout parameter may be any amount or number, and the invention is not limited to any particular odds of winning, number of winning tickets, payout amount or type of payout. However, according to one embodiment, the overall odds of winning, amount and type of payout, etc. may be similar to a game previously approved by regulators (e.g., scratch ticket games, Keno, bingo, etc.) so that the use of an additional game to display an outcome associated with the previously-approved game is scrutinized much less by regulators, and as a result, the approval of the additional game is less burdensome. To this end, a system associated with the previously-approved game may provide ticket and outcome information to a system conducting an online game (e.g. server 103).

The code stored on the server (e.g., server 103) may be used to determine game play as played on the computer system. For instance, the game outcome may be "Win $50." In the case of a slot machine-type game, the ticket may indicate that the player receives 10 spins of the slot machine. The outcome of each spin may be predetermined, and the game may retrieve information from the server indicating a predetermined sequence of game play as discussed above. In the case of a slot machine-type game, the predetermined sequence may indicate the winnings associated with each of the spins. In the case of a dice game, the outcome of each instance of the second level game may be stored on the server and retrieved prior to game play. In another example in the case of a single instance of a dice game, intermediate reveal outcomes to be displayed to the player during the single instance of the dice game may be stored on the server and retrieved when necessary. These outcomes may be revealed to the player at different points during play of the dice game. For instance, outcomes may be revealed when a player performs an action in the dice game (e.g., draws certain die outcomes) or performs an action (e.g., spins the slot machine) in the slot machine game, etc.

In another example, only the overall outcome is predetermined (e.g., the total winning associated with the ticket), and the sequence of game play may be determined when the game is played. In the example above where the player is indicated as winning $50 over 10 spins, the $50 winnings (and any intermediate losses) may be allocated to the player at any point over the 10 spins. In the case of the dice game, winnings may be allocated across game instances. In a further example, winnings may be allocated across items collected (e.g., spins) while playing the dice game. Because the number of items collected may vary depending on the skill of the player, the distribution of prizes among collected items may be determined during game play by the game playing system. Thus, according to one embodiment, the player's skill (or lack thereof) does not affect the overall outcome of the game. In one example, the player may be provided a single spin prior to play of the dice game.

This allocation may be determined by the server, the game software executing on the client, or a combination thereof. Further, the game play may be randomized in that a further play using the same ticket may yield a different sequence of game states leading to the same outcome. For example, in the case of a slot machine game as described above, a player may be indicated as winning $50, but the sequence by which the player attains the $50 winning outcome may be different depending on various factors. Such factors may include a randomization function that determines results of individual game plays (e.g., in the case of a series of "spins," the result of each spin), or some other function. The series of intermediate outcomes may be stored in a database associated with the server as discussed above with respect to game outcomes. Also, the outcomes may be adjusted using a formula or rule-based approach during execution of the game to increase the game drama and heighten the game playing experience.

According to another aspect of the present invention, a player may purchase a ticket at a point of purchase (e.g., a convenience store) and the indication of a win/no win condition of the ticket is revealed on a different medium. For instance, a player purchases a scratch ticket in a convenience or other type of store. The prize that the player wins is not revealed on the scratch card itself, but rather the prize is revealed through another medium (e.g., on a home computer system, PDA, cell phone, etc.).

For instance, as discussed above, the player may be presented another game (e.g., a slot machine or dice game as described above) that reveals at least a portion of the prize. The underlying prizes available via the reveals may be predetermined, in that the outcome of the game may be stored in one or more systems. The scratch ticket may reveal different numbers of plays (e.g., pulls in the case of a slot-machine type game, or game instances of a dice game) the player receives.

In one aspect of the present invention, the ticket includes authentication information that is used to obtain the reveals. In one example, the scratch ticket contains a secret key which is used to decrypt the results that are revealed to the player. That is, according to one aspect, it is impossible to determine if and what a particular ticket wins without having possession of the ticket (and therefore the secret key). In another example, the scratch ticket could contain only a portion of the secret key. The other portion of the key may be stored, for example, on a server and retrieved from a database (e.g., file, relational database, etc.) based on, for example, the serial number of the card. Mappings of serial numbers of tickets to encrypted results can be provided to the lottery provider for additional audit control.

Figure 4:
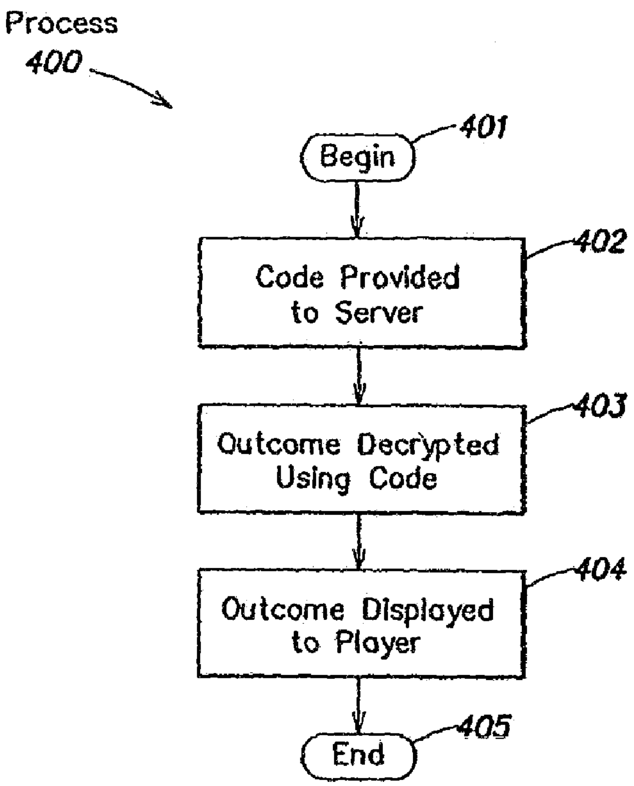
FIG. 4 is a flow chart of a process for conducting a game according to another embodiment of the present invention.

A process for performing secure access to outcomes is shown in FIG. 4. At block 401, process 400 begins. A server (e.g., server 103) may store a number of outcomes in encrypted form, each of which outcomes can be accessed by a respective code. These outcomes may be encrypted, for example, using any encryption method (e.g., symmetric, asymmetric encryption) as is known in the art. At block 402, a code is provided to the server (e.g., server 103).

This code may be, for example, a secret code (e.g., a symmetric key, a private key) printed on a ticket and provided to the server by a user through an interface of a computer system as discussed above. The received code may be transmitted between systems using a secure transmission method (e.g., SSL) as is known in the art. The received code is used at block 403 to decrypt the outcome stored on the server. This code may be any decryption key type that may be used to decode data, and may be of any format or length. The decrypted outcome may then be presented to a player at block 405. The outcome may be displayed using any method. For example, as discussed above, the outcome may be presented through one or more reveals presented to the player during play of an online game. At block 405, process 400 ends.

Another aspect of the present invention relates to a lottery-based software game that can be played over a network, such as the Internet. According to one embodiment, the system includes a purchase of a scratch-based or printed ticket by a player at a point of service (POS). A POS may be, for example, a place at which lottery tickets may be sold, including convenience stores or other locations where lottery products are provided. In an alternative system provided at a casino or other gaming establishment, a ticket may be sold to a player at the casino for play at a later time.

The player receives the ticket at the POS or other location, and proceeds to play a computer-based game at another location to reveal a result (or outcome) of the game. The computer-based game may be, for example, a casino-type game (e.g. slot machine, video poker) or other type of game, including amusement games or games of chance. In the case of the scratch or printed ticket, the result is not apparent to the player until the player plays the computer-based game. This game may be, for example, a software program that is downloaded and played over the Internet. Alternatively, other ways of accessing the online portion of the game may be used (e.g., PDA, cell phone or other method).

The ticket includes a code by which a player gains access to a result stored on a server that stores ticket information and results associated with each ticket. Such information may be predetermined at the time of ticket sale, or the results may not be known until a later time, after the ticket is issued to the player (e.g., in the case of a Keno, bingo, or other drawing-based system). According to one embodiment, the code is an access key (or a portion thereof) that is used to access the result stored on the server. Further, the result (stored in the server) may be encrypted. For example, the code may be a private key or a symmetric key. The key may be transmitted by a client computer system to the server for the purpose of decrypting the result using SSL or any other secure method.

Because the decryption key is stored on the ticket, the gaming system is safer, as a breach of security of either the tickets or the server does not provide access to result information. More particularly, access to the lottery ticket database may not be accomplished without the ticket (used to decrypt the result). Further, the tickets may not be correlated to results without the lottery ticket database (because, in one example system, the results are stored in the database, not on the tickets).

In another example of the system, a portion of the key used to decrypt results of the game is stored on the ticket, and another portion is stored in the database of the server. In this manner, it is assured that possession of either portion of the key may not compromise the results.

However, it should be appreciated that the system does not require SSL or any other encryption/decryption method, a decryption key on the ticket, or the stored result on the server to be encrypted. Rather, the game can be implemented with or without these features. That is, access to the outcome stored at the server may be performed using only the serial number or other ticket identifier printed on the ticket.

The scratch-based or printed ticket also includes a second serial number or other identifier (e.g., an access code) in addition to the serial number or other identifier which is correlated to results on the server. A ticket may include both a serial number and a ticket identifier used by the system. According to one embodiment, it is appreciated that there may be security issues with using the serial number of a printed ticket (as printed on the ticket) to correlate to win outcomes. That is, the lottery provider may not allow any entity outside of the lottery system to have the ability to correlate outcomes to serial numbers. To this end, another identifier (e.g., a separate ticket identifier or access code) may be provided on a ticket to allow the system to index into an outcome database.

In one example system that works in association with a lottery system, outcomes for a game may be predetermined to comply with lottery rules. In this case, outcomes are predetermined and stored in a database. In an alternative environment where results are not permitted to be predetermined (e.g., in a casino), but rather are determined at a later time (e.g., by a drawing or other method), a ticket issued by a system in such an environment may have an associated drawing time when a game may be played. In the case where the online game system is driven by a Keno game result, each ticket may be associated with a set of numbers in the Keno game, and the result of the Keno game is provided as the result for the online game. In one example, a computer system automatically picks numbers associated with the ticket at the point when the ticket is issued. Thereafter, when the Keno game occurs, the result of the Keno draw is provided to an online game system, which translates the Keno result to a game experience within another game (e.g., dice game, slot machine, etc.). It should be appreciated, however, that although the game of Keno may be used to drive an online game experience, other games (e.g., bingo) may be used.

The server (e.g., server 103) may be capable of accepting, from the user, an input of the serial number and decryption key, and in response, providing the results associated with the particular ticket. The result or outcome of the game may be displayed to the player in an interface of the computer system (e.g., a client computer system such as a personal computer (PC)) used to play the computer-based game. For example, the outcome of a series of plays associated with the ticket may be stored in the server, and provided to the client, and the series of outcomes may be presented to the player during play of the computer-based game.

In another embodiment of the system, a payout of the ticket may be encoded on the ticket. For instance, if the ticket is a $5 winner, the amount of the win may be encoded on the ticket. In the case of the casino-based version of the system, the payout may not be stored on the ticket (as the payout is not predetermined), but rather the purchase price of the ticket may be stored on the ticket, or some other identifier of the ticket.

Figure 5:
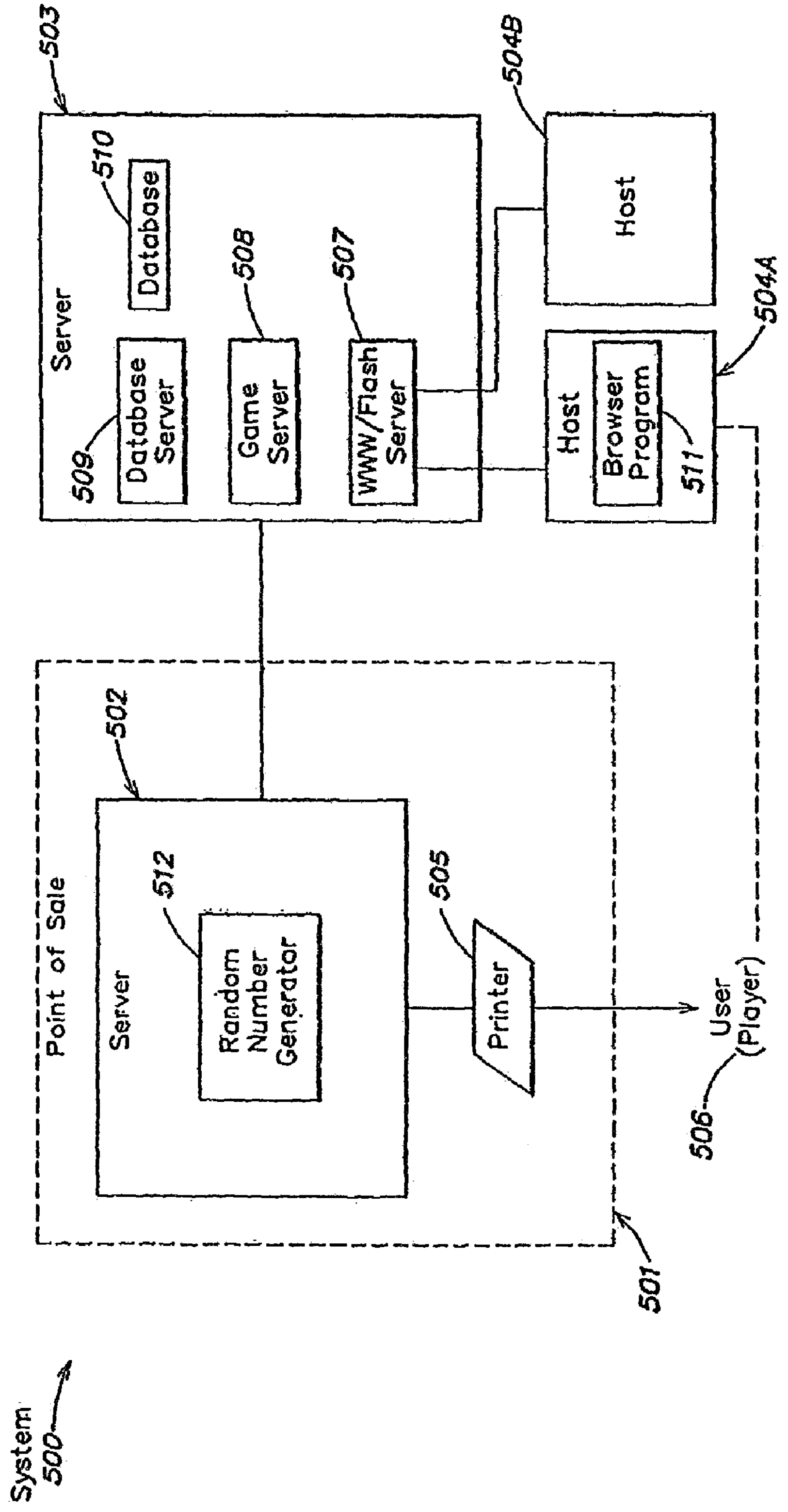
FIG. 5 is a system for conducting a game according to according to one embodiment of the present invention.

As shown in FIG. 5, a system 500 may be provided having more than one server. For instance, a server 502 provided at the point of sale 501 is primarily responsible with issuing tickets to a user/player 506. To this end, server 502 may issue preprinted tickets or may issue tickets printed from an associated printer 505. Such tickets may include one or more identifiers as discussed above with reference to FIG. 2. As discussed, another system such as a Keno or lottery-based system may be used to provide results to an online game system.

In one version of system 500, the win/loss determination of a ticket may be driven by a later-occurring drawing. For example, a Keno-based, bingo-based, or other type lottery draw system may be used wherein the outcome of a particular game is not known until a future time (e.g., when a drawing occurs). In this case, the ticket identifier stored on the ticket may be an access code generated from ticket identifiers in the Keno-based system (e.g., by an intermediate system or the Keno server itself that can translate a Keno ticket identifier into another type of identifier).

Generation of an identifier separate from the Keno ticket identifier may be necessary for security reasons relating to the Keno system. More particularly, access to the Keno ticket identifiers may not be permitted by the system (e.g., the Keno server). In one example, a Keno system translates Keno ticket identifiers into access codes and results that are stored on the game server (e.g., server 503). Thereafter, clients (e.g., hosts 504A, 504B) access results stored on the server based on their respective access codes.

As discussed above, one or more hosts 504A, 504B (e.g., general purpose computer systems) may communicate with a server 503 over a network for the purpose of conducting a game. In one example, a host 504A renders a browser window by executing a browser program (e.g., the Internet Explorer browser program available from the Microsoft Corporation). A user/player 506 enters a URL address specified by an issued ticket in a window of the browser interface, and is directed to a website associated with server 503. This website may be rendered by, for example, a WWW server process (e.g., server 507) associated with server 503.

Player 506 may be instructed to enter an access code (and/or any other required information) to access one or more games in an interface presented through the browser. As discussed, server 503 may validate the received access code, and provide any results stored in a database associated with server 510. Once validated by server 503, the user may be permitted to play one or more games. These game may be, for example, be programmed using one or more programming languages (e.g., Macromedia Flash) and may be downloaded to host 504A and executed.

Also, outcomes associated with any games may be downloaded prior to game play. As discussed, examples of games include those that may be of the lottery-type (e.g., having a predetermined outcome) and those that are casino-based (e.g., having an outcome that is not determined at the time of sale of the ticket). In the case where a later drawing affects an outcome, a player may not be permitted to play the game until the drawing occurs (and until results are available at server 503). In the case of a drawing that affects outcomes, drawing results can be communicated from server 502 to server 503. In addition, server 502 may maintain a mapping from a ticket identifier (e.g., a serial number) to an access code provided on the ticket, and provide a mapping of outcome to access code when the drawing occurs. As discussed, such outcome information may be maintained in a database 510 associated with server 503 and may be accessed through a database server process 509.

As discussed, the payout of the lottery ticket may be displayed to a player in a number of ways. For instance, the payout of the ticket may be presented to the player through one or more reveals presented to a player during one or more plays of an online game.

For instance, in the case of a slot machine game, a player may be permitted, with the issue of a single scratch or printed ticket, a series of spins of the slot machine. The slot machine may, as the result of each of the spins, produce results that contribute to the overall payout to the player. For instance, after a single spin, a player may be presented an indication that he/she has won $5. The payout to the player as provided from the server database may be, for the series of spins, $50 overall, with particular outcomes for each spin. Additional spin results may provide the additional $45 that the player will receive. Additional spins may add, subtract, or have no affect on the contribution to the outcome of the game. These results of each spin of the slot machine game may be stored in the database of the server indexed by the ticket identifier, or may be randomly determined by the game program that renders the game. Further, as discussed above, the results of each spin may be "scripted" such that the game experience is more exciting to the player.

For example, in the case where the results of each spin are stored on the server, the series of results may be downloaded to the client at the beginning of the game as a series of entries, and the client may reveal each result as the player progresses through the series of spins. In the random method, results for each individual spin are not predetermined, but rather are determined by the client in a random manner. For instance, the actual outcomes of each spin may be randomly chosen among the possible combination of outcomes that may produce the required payout. In either case, the outcomes for each spin of the slot machine game is not stored on the ticket, but rather is stored at the server and downloaded just prior or during game play, or is determined randomly by the client. Alternatively, the client may determine the game experience based on a predetermined set of rules or formulas that, when an overall outcome is provided, allows the client to determine intermediate outcomes in a dynamic way.

Because the game play and outcome are scripted, a player may also not play the game (and possible secondary games) to actually win. A player may purchase a ticket, wait until the ticket may be redeemed, and go to a POS to find out (and if necessary, receive) his/her winnings. A ticket may be allowed to be redeemed after a predetermined period of time after the drawing independent of whether the player has played the game. A ticket may be able to be redeemed after a predetermined period of time, from almost immediately to seconds to days or any predetermined time. For tickets with results dependent upon results of a particular Keno game or other event, the ticket may not be redeemed until after the event has passed.

Finally, after play of the online game, the player is permitted to validate the ticket at any POS location (e.g., 501 (for example, a lottery agent, casino, or other gaming establishment) to redeem his/her winnings as indicated during the online portion of the game. According to one embodiment, players are permitted to redeem their winnings only after playing the online portion of the game. The player, by playing the online portion of the game, sets status information at the server (e.g., server 503). When the player attempts to redeem the ticket at the POS (e.g., 501), the status information may be checked, and the player is permitted to redeem his/her winnings. To this end, server 503 may communicate information back to server 502 relating to game play.

For instance, server 503 may collect information that indicates the sequence of game play performed at the client, and other player tracking information. In one example, tickets may be associated with a particular player, and the player may be awarded loyalty points or other credit for playing the game.

Taking a dice game, a player is issued a ticket at a POS to play one or more instances of the dice game. The ticket indicates an access code, and the player uses this access code to gain access to the system (e.g., from a host coupled to server 503 through the Internet). The player enters the access code in a user interface, and, once validated, is permitted to play the dice game. In one example, the dice game includes a dice prediction game where a player predicts one or more outcomes of a dice roll. Optionally, the player is permitted to play, based on a single access code (and ticket), any one of a number of games available from server 503. Such an option may allow a player to play different games for each game instance associated with the ticket.

Figure 6:
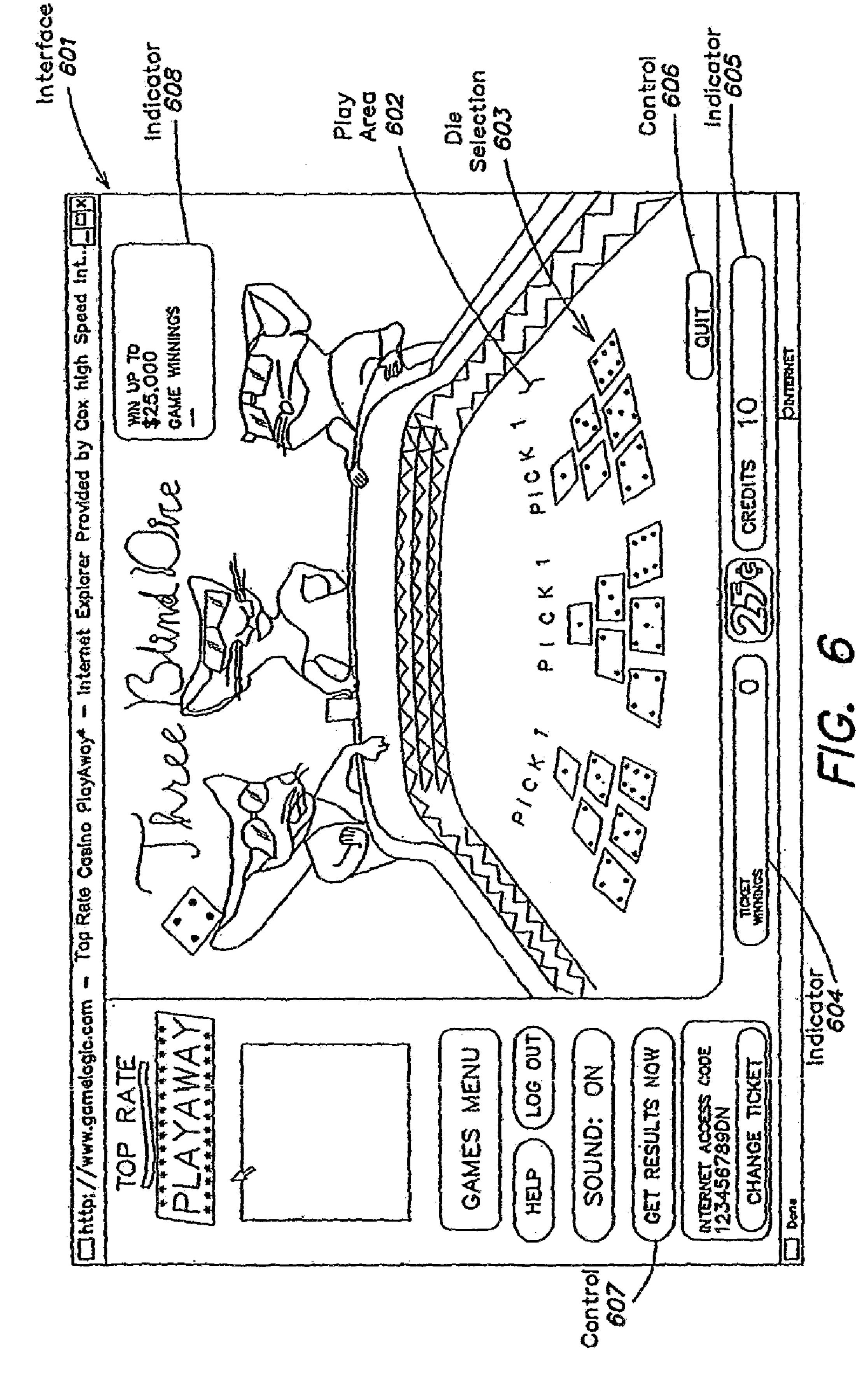
FIG. 6 is a game interface according to one embodiment of the present invention.

FIG. 6 shows an example game interface according to one embodiment of the present invention. According to one embodiment of the present invention, the dice game includes an interface 601 that shows the dice game to the player (e.g., in an interface of a computer system). In one example, the dice game includes a roll of three dice whose outcomes are predicted by the player prior to the roll of the dice. Each die may include, for instance, six sides each having indicia (e.g., one through six dots, a numeral, etc.) that identifies a particular die outcome that can be predicted by the player. Although the dice may include one or more "traditional" dice indicia (e.g., dots) and number of sides, it should be appreciated that other game pieces having any number of sides, shapes, and/or indicia may be used.

Interface 601 may include a play area 602 in which the dice are "rolled." According to one aspect of the present invention, roll of the dice are animated in an interesting way to maintain player interest. In one specific example, the game may include one or more mice or other animated characters that roll one or more dice within the play area 602. Such characters may perform other actions that entertain the player during game play to maintain player interest, present prizes to the player, or perform other actions associated with the game.

As discussed, the player may be permitted to predict the outcome of one more dice rolls. To this end, the player may be permitted to select one or more outcomes which indicate the player's prediction. Such outcomes may be selected, for instance, by the player within interface 601. In one example, possible die outcomes are displayed in play area 602, and the player is permitted to make a selection (e.g., die selection 603) for a particular die outcome.

The player may be further permitted to select all outcomes for dice to be rolled, after which, the player may be permitted to roll the dice. According to one embodiment, there may be a pay table that correlates correct die predictions (e.g., one, two, or three dice matches) with a prize to be awarded to the player. In the case of a two-level game, dice predictions may be correlated to items (e.g., spins, etc.) that are awarded to the player.

The dice game may begin, for example, by the player indicating predictions for each one of the dice. The player indicates, for example, in play area 602 what outcomes are predicted for each die rolled. Based on the dice roll results, the player is awarded the appropriate prize or not, depending on his/her predictions. If the player is awarded a prize (e.g., a prize, one or more spins of a second level game, etc.), the game program may indicate to the player that he/she has won (e.g., by indicator 608) along with any indication of any prizes won. Interface 601 may also include an indicator 604 that shows a running total of any prizes won within the game instance. Although the example discussed above uses a three-dice game, it should be appreciated that the dice game may be any type or version, having any number and type of valid dice with any type of indicia, and it should be appreciated that the invention is not limited to any particular game version, number, and type of dice.

As discussed, the player may be permitted more than one roll of the dice. As shown in the example, the player may be permitted to play ten (10) rolls of three dice, although any number of rolls may be permitted. The player continues to roll the dice, trying to obtain prizes. Alternatively, or in addition to prizes, the player may play for one or more items (e.g., spins) for use in a second level game. An indicator 605 may be provided to show the player the number of remaining credits (e.g., the number of rolls) that remain in the dice game.

Interface 601 may also include a number of controls to assist the player in playing the dice game. For instance, a quit control 606 may be provided that, when selected by the player in interface 601, exits the game and shows any winnings to the player. Optionally, interface 601 may include a separate control 607 to allow the player to display any results of the game to the player within the interface without playing the dice game.

Prizes may be awarded in a first level game, a second level game, or both. In one example, one or more win opportunities may be associated with the first level game. The win opportunities may be revealed to the player when, for example, a particular dice combination is achieved, or other aspect is achieved in any of the first or second level games, either collectively or individually. Optionally, there may be an indicator that shows the player any prizes he/she may have won during play of the first level game. As discussed above, results of win opportunities may be stored in a server and downloaded to a game-playing computer system prior to play of the game, may be determined dynamically by the game-playing computer system, or may be determined in any other manner.

However, it should be appreciated that although a prediction game depends upon the skill in selecting particular dice combinations, according to one embodiment of the present invention, the play of the dice game (e.g., the player's predictions) does not affect the prize awarded to the player. Rather, the play of the dice game is independent of the prizes awarded to the player. Such prizes may be revealed to the player during the play of the dice game or any associated second level game (e.g., a slot machine game).

Figure 7:
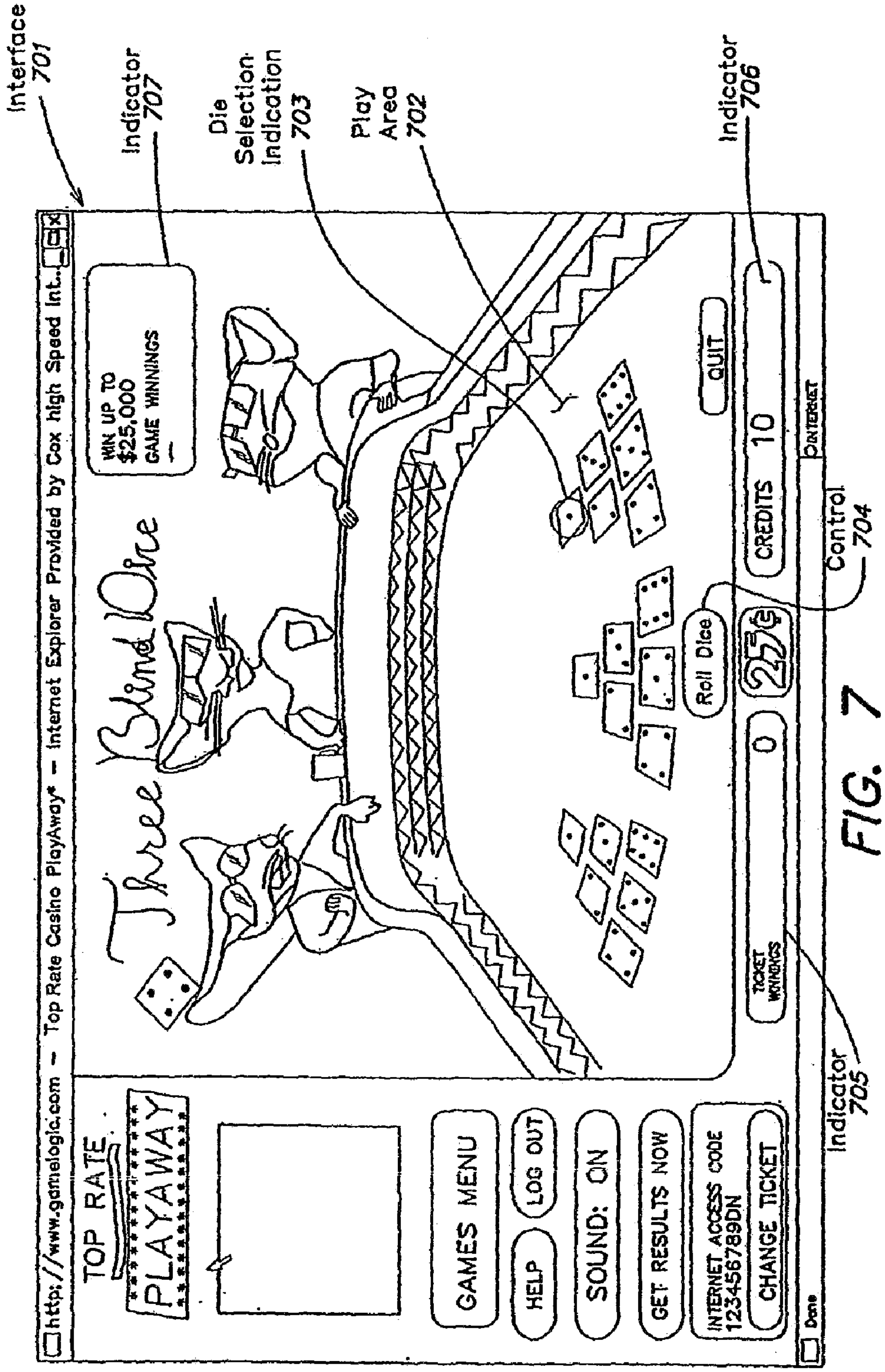
FIG. 7 is a game interface according to another embodiment of the present invention.

FIG. 7 shows one example of an interface 701 associated with a dice game according to one embodiment of the present invention. Similar to interface 601 discussed above, interface 701 permits a player to select one or more outcomes within a play area 702 of interface 701. According to one embodiment, interface 701 displays, for each prediction, a die selection indication (e.g., indication 703) that indicates the prediction made by the player. The indicator may include, for instance, a "marker" or other indication of a selection of an outcome. In one example, the marker may be placed on a representation of a die outcome. Other indications (e.g., highlights, outlines, colors) may be used in place of or in addition to the marker indication.

After all dice predictions are made, a control (e.g., "Roll Dice" control 704) may be displayed to the player and activated to allow the player to roll the dice. When the dice are rolled, any results may be displayed to the player (e.g., by indicators 705, 707), the results indicating any intermediate and/or total prizes awarded to the player.

Figure 8:
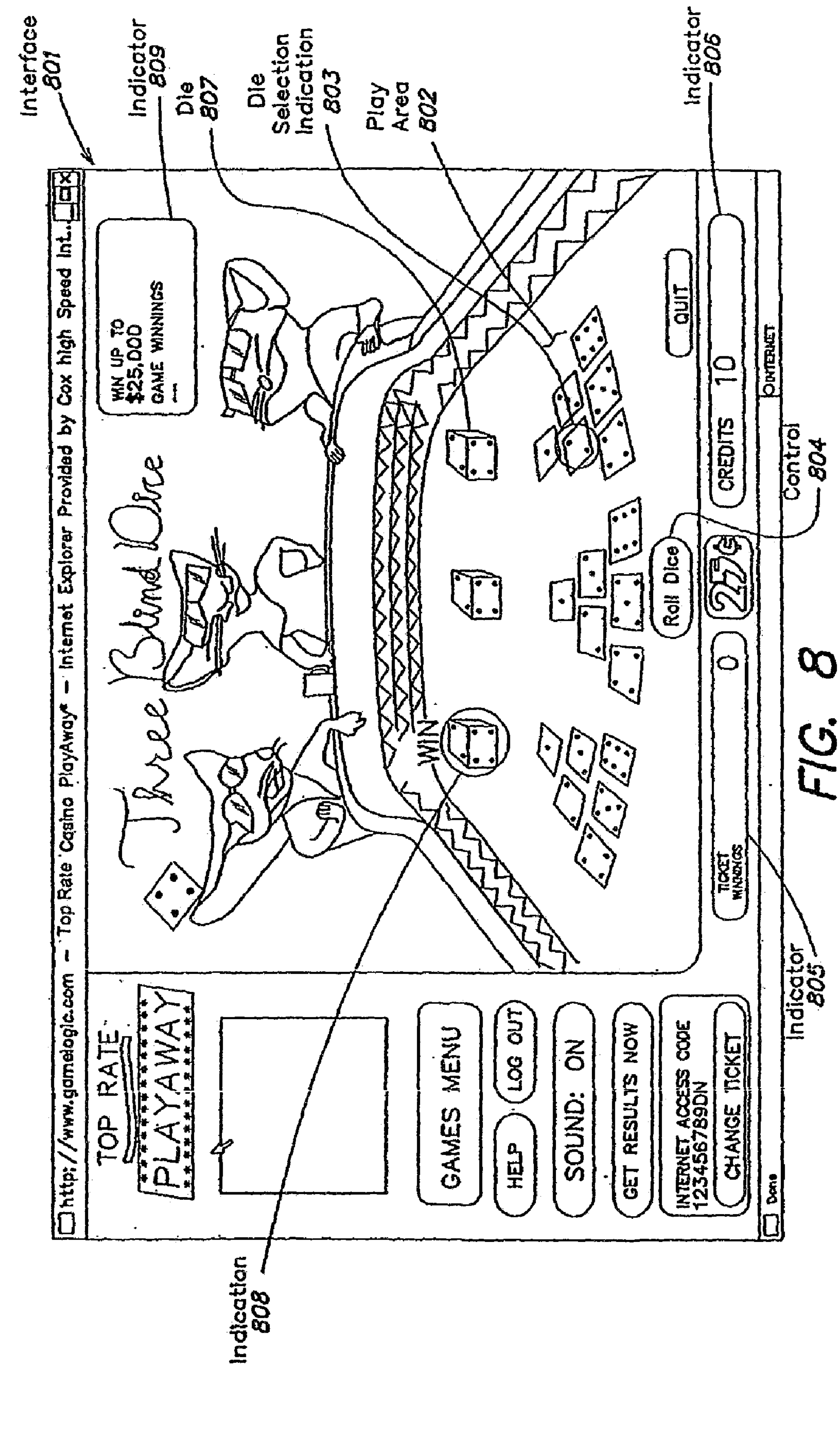
FIG. 8 is a game interface according to another embodiment of the present invention.

For instance, as shown in FIG. 8, a display 801 may within a play area 802 show an indication (e.g., indication 808) of a winning outcome of the prediction (e.g., a die roll of a 2 matching a prediction of 2 for a particular die). For instance, if a match occurs between a player's predicted outcome for a particular die as indicated by a die selection indication (e.g., item 803), the player is awarded a prize or other item. As a result of a win, one or more indications (e.g., items 805, 809, etc.) may be presented to the player indicating that a prize is awarded to the player.

Whether the player wins or loses in a particular roll, a credit to the player may be decremented as shown by indicator 806, for example. According to one aspect of the present invention, additional credits (or rolls) may be awarded to the player during play of the dice game. However, in one example game format, prizes for a particular game instance or series of dice game instances is predetermined, and the awarding (or not) of additional rolls does not affect the overall game outcome.

The dice game may be a single level game, may be combined with other types of single level games, or may have an associated second level game. In one embodiment, the dice game may be associated with a second level game such as a prize wheel, slot machine, or other type of game in which an overall prize may be revealed. In one example game format, prize values are associated with items awarded in a first level game, and item are used to reveal prizes awarded (or not) in the second level game. An interface associated with a second level game may be shown within the same (e.g., in a same window, screen, etc.) interface as interface 601. Alternatively, the interface of the second-level game may be presented in a different interface of the game-playing computer system.

In one embodiment, a slot machine game is presented in an interface of a second level game (not shown). A set of indicia positioned across a number of reels along one or more lines may correspond to a combination of indicia that are matched to points in a pay table. The pay table may indicate, for instance, a correlation between combinations of indicia and awarded prize (or credit) totals. Such indicia may include types of objects, when matched in a particular combination, yield the player a prize. If the indicia across one or more lines match that indicated by the pay table, the player may be awarded a corresponding prize indicated by the pay table.

According to one aspect of the present invention, the player may be presented (either in the dice game and/or associated second level game) an indication of a "near miss." For example, the dice combination presented in the play area may be adjusted by a game playing computer system to be close to a winning combination. According to another embodiment, the combination presented to the player may be close to a winning combination that has a significant prize to motivate the player to continue playing the game.

After play of the second level game, or after an instance of the first level game (e.g., a roll of the dice), game play may be returned by the game program to another instance of the first level game (e.g., the dice game). The player may, however, choose to play a different game (e.g., a card game or other game) at the conclusion of any particular game instance.

The player may be permitted to play further instances of the dice game wherein intermediate prizes are revealed. Amounts of intermediate prize that are revealed with each instance of the dice game, as discussed above, may be stored in a database of the server, and provided to the client prior to or during game play. Alternatively, intermediate prize amounts may be determined at the client in a random manner (e.g., by randomly selecting a possible combination of intermediate prize amounts that total the overall prize awarded to the player). In another example, a game may be determined dynamically by the game system or client based on one or more rules. These rules may be tailored so that the overall result is revealed by the game system in an interesting way.

For instance, the ticket may have an overall prize value of $50, and the prize awarded at each instance (e.g., each roll) of the dice game may accumulate to form the $50 prize. There may be a finite number of combinations based on the number of game instances to achieve a $50 prize, and the actual game experience presented to the player may be a random selection of the finite outcomes. In any case, the result of each game instance is either stored at the server or is determined randomly or dynamically by the client as discussed above.

According to one aspect of the present invention, it is realized that the time at which tickets are activated (and therefore, may be played) is important. In the case of a casino-based game, where tickets are issued at the casino, it may be beneficial to include a delay between the purchase of a ticket and a possible redemption of the ticket so that the game play associated with the ticket does not compete against other games offered by the casino (e.g., floor games such as craps). For example, in the case of a dice game, it may be preferable that such a game be activated after the player leaves the casino, or otherwise is not playable while in the casino so as not to compete with other types of dice games (e.g., craps tables, video craps, etc.) or other game types offered by the casino.

Further, another benefit of introducing a delay between ticket issuance and activation includes increasing the likelihood that the player plays the game at another location (e.g., at home), requiring the return of the player to the ticket redemption location to redeem his/her winnings. Because the player needs to return to the redemption location (which may be a casino), the possibility that the player will purchase additional tickets or play other types of games offered at the redemption location is increased.

According to one embodiment of the present invention, a dice game is conducted that may include the following additional aspects, either alone or in combination:

Example Game Format

- According to one example game theme, the game is "Three Blind Dice" having three animated mice involved in elements of the game.
- The mice should each hold a die, and each roll a die.
- The mice and the dice should be color coordinated (e.g., one red, one blue, one green).
- When a correct prediction is made, the mouse who threw the winning die should be prodded to react, then reveal the dollar value.

Basic Gameplay

According to one example format:

- The player rolls three dice and predicts what result each die will show when rolled. Each correct prediction earns the player a prize.

Game may have an automatic play mode that permits unattended play. Each play includes one roll of three dice.

One example game format supports split wins.

Predicting the Outcome

The game-playing computer is adapted to prompt the player to make their prediction of the dice outcomes.

This prompting may be presented, for instance, in the form of a portion of a persistent on-screen display that draws attention to itself when it is time to make a prediction. For example, the portion may become highlighted when a selection needs to be made.

The following message may be indicated to the player: "Click 3 dice you think will be rolled, then click ROLL DICE."

There will be a Prediction Area, where players will make their selection and where their selections will remain viewable to them.

A Prediction Area of the play area may contain a representation of each side of a six-sided die.

To mark a prediction, the player selects (e.g., by clicking on) a die-face to automatically place a marker.

A Marker Holding Area area of the play area may indicate the number of markers remaining.

The player may be restricted to placing a single marker on a single die-face.

Rolling the Dice

There may be, within a play area of the interface, a Dice Rolling Area, which is a bounded space in which the dice are rolled.

Associated with the Dice Rolling Area may be a "Roll Dice" control (e.g., a button).

The "Roll Dice" control may be marked as inactive, for example, until three predictions have been selected.

When the player is satisfied with his/her predictions, the player may select the "Roll Dice" control.

In one example game format, animated mice pick up the dice, and toss the dice.

According to one embodiment, it is appreciated that because the player, in their selection of the expected dice outcomes, perceives that they affect the game outcome, anitmation of dice rolling should not appear to be predetermined. Rather, the behavior of each die—how it moves, if it bounces off a wall of the field, etc.—should, as much as possible, appear random. Further, it may be preferrable that an animation of each die rolling appear different from roll to roll as much as possible. That is, according to one embodiment, the animation of each die may be determined in a random manner. In another example interface, the dice may be caused to land somewhere near a matching colored mouse.

Results of the Roll

Once all the dice have settled to a stop, the results may be compared to the player's prediction.

If the comparison indicates a win, the appropriate mice may be anomated to react, then reveal a prize (e.g., a dollar value).

If the comparizon indicates a loss, a message may be displayed indicating, for example, "No Match—Repeat This Bet or Choose New Dice"

The player may be permitted to move the markers to different spots, but, in one example game format, a credit is not used until the player activates the "Roll Dice" control.

Alternatively, the player may select a "Repeat This Bet" control (e.g., a button) that causes the game to use another credit, keep the markers in place, and roll the dice again to reveal another outcome.

The amount won may be shown to the player in a prize box.

At the conclusion of the game (e.g., after all of the credits have been used by the player), the player is presented an indication that the game is over and an indication of any prize(s) awarded.

The overall result (e.g., payout) for purchasing a ticket may be predetermined (as in a scratch or other type of instant lottery game) or may be determined by a later event (such as a lottery, Keno, or bingo draw) that occurs after ticket issuance.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

What is claimed is:

1. A computer implemented method for playing a wagering game of chance comprising acts of:

issuing a ticket to a player for the wagering game of chance, the ticket including a code printed on a surface of the ticket;

providing access to a primary game, comprising a computer-based game of chance, including an act of validating at least the code sent from a host computer to an authentication server through a communications network, the authentication server being separate from the host computer;

accessing a stored result of the wagering game of chance using the code, wherein the stored result is determined by play of a secondary game different than the primary game on an outcome generating server separate from the host computer;

providing for the player to play the computer-based game of chance on different medium than the issued ticket, wherein the player accesses a game interface of the computer-based game of chance, and wherein the computer-based game is configured to reveal the stored result of the wagering game of chance in response to play of the computer-based game of chance on the different medium;

requiring, during play of the computer-based game, that the player provide a prediction of an outcome of game play in the game interface of the computer-based game; and displaying an outcome of the computer-based game, wherein the outcome of the computer based game is adjusted to reflect at least the prediction of the game play and the stored result of the wagering game.

2. The method according to claim 1, wherein the act of issuing a ticket includes issuing at least one of a lottery ticket, a scratch ticket, and a pull-tab ticket.

3. The method according to claim 1, wherein the stored result of the wagering game of chance include an overall prize value, wherein the computer-based game of chance is further configured to reveal the stored result of the wagering game of chance in response to play of a plurality of game instances of the computer-based game of chance, and wherein at least one prize awarded in response to play of the plurality of game instances of the computer-based game accumulates to form the overall prize value.

4. The method according to claim 1, wherein the act of providing a computer-based game further comprises an act of permitting access to the stored result of the wagering game of chance by using the code as a decryption key to obtain the result.

5. The method according to claim 1, further comprising an act of storing, on a server, result of the game of chance.

6. The method according to claim 1, further comprising storing, in a database of a computer system, a portion of a decryption key, the portion being used along with the code by the computer system to obtain the result.

7. The method according to claim 1, wherein the act of providing includes an act of permitting access to a website to play the computer-based game.

8. The method according to claim 6, further comprising an act of obtaining, from the database of the computer system, the portion of the decryption key based on an identifier printed on the ticket.

9. The method according to claim 8, wherein the identifier is a serial number associated with the ticket.

10. The method according to claim 1, further comprising an act of presenting, to the player, an interface in which the player is permitted to enter the code to obtain security access to the result.

11. The method according to claim 1, wherein the computer-based game of chance includes a dice game, and the act of requiring includes an act of requiring a prediction by the player of one or more die outcomes.

12. The method according to claim 1, wherein the computer-based game includes an associated second level game.

13. The method according to claim 1, wherein the computer-based game is a computer-based dice game involving a plurality of rolls of one or more dice, and wherein the player plays the plurality of rolls of one or more dice within an interface of the computer-based game.

14. The method according to claim 1, wherein the ticket discloses the number of game instances of the dice game awarded to the player.

15. The method according to claim 1, wherein the prize total for the ticket is predetermined.

16. The method according to claim 15, wherein the sequence of reveals is predetermined.

17. The method according to claim 15, wherein the reveals are randomly determined by the client.

18. The method according to claim 16, wherein the sequence of reveals is stored in a database of a server.

19. The method according to claim 13, further comprising an act of revealing, to the player, an item associated with a second level game.

20. The method according to claim 19, wherein the item is used to play a second level game.

21. The method according to claim 20, wherein the item is used by the player to reveal a prize won by the player during play of the second level game.

22. The method according to claim 1, wherein an act of playing the dice game reveals an outcome.

23. The method according to claim 1, further comprising acts of determining whether the result of the game of chance includes a winning outcome, and if so, presenting to the player one or more of the predicted outcomes as a winning outcome.

24. The method according to claim 23, further comprising an act of displaying, if the result of the game of chance includes a winning outcome, a prize awarded to the player.

25. The method according to claim 1, wherein the result of the game of chance are determined prior to play of the computer-based game.

26. The method according to claim 23, wherein the outcome is determined independent of play of the computer-based game.

27. The method according to claim 24, wherein the prize won by the player is at least one of cash, merchandise, and credit.

28. The method according to claim 24, wherein an indication of the prize won by the player is stored in a database of a server, and is downloaded to a computer presenting the computer-based game to the player.

29. The method according to claim 1, further comprising an act of associating, with the ticket, additional opportunities to win.

30. The method according to claim 29, wherein the additional opportunities to win include one or more additional reveals of results associated with the wagering game of chance.

31. The method according to claim 30, wherein the one or more additional reveals of results are presented during play of an online game.

32. The method according to claim 1, further comprising an act of providing, by a first server associated with a first game, a result associated with the wagering game of chance.

33. The method according to claim 32, further comprising an act of storing, in a memory of a computer system, the result associated with the game of chance.

34. The method according to claim 33, further comprising an act of associating the result with an indication of the ticket.

35. The method according to claim 34, wherein the indication of the ticket is unique among indicators of a plurality of tickets.

36. The method according to claim 32, wherein the first server further comprises a random number generator, and the random number generator performs an act of determining a set numbers associated with the issued ticket.

37. The method according to claim 32, further comprising an act of determining a set of winning numbers associated with the game of chance.

38. The method according to claim 37, further comprising an act of determining the result of the game of chance based on a comparison of the set of numbers associated with the issued ticket and the set of winning numbers.

39. The method according to claim 36, wherein the game of chance includes at least one of a Keno game and a bingo game, and the act of determining a set of numbers associated with the issued ticket comprises an act of selecting a predetermined number of numbers from a predetermined set of numbers.

40. The method according to claim 1, wherein the player must wait until a specific event has been completed before gaining access to obtain the result associated with the ticket.

41. The method according to claim 1, wherein the issued ticket discloses a number of game instances awarded to the player.

42. The method according to claim 1, wherein the result of the wagering game of chance for the ticket is determined after the ticket is issued to the player.

43. The method according to claim 42, further comprising an act of determining an outcome associated with the ticket based on a drawing.

* * * * *